US010949883B2

(12) United States Patent
Wan et al.

(10) Patent No.: US 10,949,883 B2
(45) Date of Patent: Mar. 16, 2021

(54) METHOD AND APPARATUS FOR DELIVERING PUBLICLY DISPLAYED INFORMATION TO MOBILE DEVICES BASED ON LOCATION HISTORY

(71) Applicant: xAd, Inc., New York, NY (US)

(72) Inventors: Feng Wan, Mountain View, CA (US); Srihari Venkatesan, Mountain View, CA (US); Saravana Ravindran, Mountain View, CA (US); Shanshan Tuo, Mountain View, CA (US); Prakash Muttineni, San Ramon, CA (US); Deborah Zhang, Mountain View, CA (US); Huitao Luo, Fremont, CA (US); Shashi Seth, Mountain View, CA (US)

(73) Assignee: XAD, INC, New York, NY (US)

(*) Notice: Subject to any disclaimer, the term of this patent is extended or adjusted under 35 U.S.C. 154(b) by 461 days.

(21) Appl. No.: 15/860,600

(22) Filed: Jan. 2, 2018

(65) Prior Publication Data
US 2018/0197203 A1 Jul. 12, 2018

Related U.S. Application Data

(60) Provisional application No. 62/441,433, filed on Jan. 1, 2017, provisional application No. 62/441,435, filed (Continued)

(51) Int. Cl.
*G06Q 30/02* (2012.01)
*H04W 4/02* (2018.01)
(Continued)

(52) U.S. Cl.
CPC ..... *G06Q 30/0261* (2013.01); *G06F 3/04842* (2013.01); *G06F 16/29* (2019.01);
(Continued)

(58) Field of Classification Search
CPC .......... G06Q 30/0261; G06Q 30/0266; G06Q 30/0205; G06Q 30/0267; G06F 16/9537; G06F 16/29; G06F 3/04842; H04W 4/02
(Continued)

(56) References Cited

U.S. PATENT DOCUMENTS 8,688,517 B2 * 4/2014 Lutnick .................. G06Q 30/02
705/14.4
2002/0174009 A1 11/2002 Myers et al.
(Continued)

FOREIGN PATENT DOCUMENTS

CA 2951266 A1 * 12/2015 ......... G06Q 30/0267

OTHER PUBLICATIONS

Betsie Estes, Geolocation the Risk and Benefits of a Trending Technology, 2016 (Year: 2016).*
(Continued)

*Primary Examiner* — Tarek Elchanti
(74) *Attorney, Agent, or Firm* — Morgan, Lewis & Bockius LLP

(57) ABSTRACT

The disclosed technology includes system and method for discovering key places for a mobile device based on historical location data associated with the mobile device. The key places are discovered by mapping the historical location data into predefined land areas in a geographical region, aggregating the historical location data into time interval sessions, selecting a first set of the predefined areas based on density of location data in each of the predefined land areas, and filtering the first set of the predefined areas to obtain the key places. The key places are used to estimate one or more travel routes routinely taken by a user of the mobile device, and to build an association database, where one or more billboards and/or points of interests near the travel routes are associated with the mobile device or its user. Information
(Continued)

documents for delivering to the mobile device are selected based at least on data in the association database.

20 Claims, 24 Drawing Sheets

Related U.S. Application Data on Jan. 1, 2017, provisional application No. 62/441,436, filed on Jan. 1, 2017.

(51) Int. Cl.
    *G06F 16/29*     (2019.01)
    *G06F 3/0484*     (2013.01)

(52) U.S. Cl.
    CPC ..... *G06Q 30/0205* (2013.01); *G06Q 30/0266* (2013.01); *G06Q 30/0267* (2013.01); *H04W 4/02* (2013.01)

(58) Field of Classification Search
    USPC .......................... 370/331; 701/455; 705/14.4
    See application file for complete search history.

(56) References Cited

U.S. PATENT DOCUMENTS

| | | |
|---|---|---|
| 2003/0149601 A1 | 8/2003 | Cabral |
| 2008/0089288 A1* | 4/2008 | Anschutz ............... G06Q 30/02 370/331 |
| 2011/0035662 A1 | 2/2011 | King et al. |
| 2012/0303455 A1 | 11/2012 | Busch |
| 2013/0096966 A1 | 4/2013 | Barnes, Jr. |
| 2015/0160016 A1* | 6/2015 | Kim ........................ G01S 19/13 701/455 |
| 2015/0332325 A1 | 11/2015 | Sharma et al. |
| 2015/0356618 A1 | 12/2015 | Vaysman |

OTHER PUBLICATIONS

XAD, Inc., International Search Report and Written Opinion, PCT/US2018/12119, dated Apr. 5, 2018, 8 pgs.

XAD, Inc., International Preliminary Report on Patentability, PCT/US2018/012119, dated Jul. 2, 2019, 6 pgs.

* cited by examiner

| | User/Mobile Device ID | Date of Last Request | Request Count | # of Days |
|---|---|---|---|---|
| 4 | 03d46d0e-1da6-47f9-a4e4-90fc0cc34926 | 2016-11-13 | 827 | 8 |
| 5 | 037753cd-3221-4aa3-b6bb-60b325b441Bb | 2016-11-13 | 798 | 4 |
| 6 | 02e07030-2b1d-4bc4-bf8c-3bc61d0a08c1 | 2016-11-17 | 785 | 8 |
| 7 | 01c0a950-e255-43ad-9d43-0b493abecf1c | 2016-11-16 | 654 | 5 |
| 8 | 0222b07c-05de-42f0-8b49-2c8f40339908e | 2016-11-16 | 647 | 8 |
| 9 | 00353E8E-77C8-4FC2-BFD6-D5A7399A862F | 2016-11-16 | 633 | 7 |
| 10 | 04386588-12e3-4898-9ae0-a63f58c1c61c | 2016-11-13 | 602 | 2 |
| 11 | 02dcafa4-212b-492e-8438-e92ab7093b27 | 2016-11-15 | 584 | 4 |
| 12 | 0321ca3e-7112-4d8a-a37f-fc15239b63b1 | 2016-11-16 | 565 | 3 |
| 13 | 03d46d0e-1da6-47f9-a4e4-90fc0cc34926 | 2016-11-09 | 445 | 5 |
| 14 | 00353E8E-77C8-4FC2-BFD6-D5A7399A862F | 2016-11-10 | 422 | 6 |
| 15 | 008E79DE-D409-439C-85D8-57A2772B7C71 | 2016-11-04 | 379 | 4 |
| 16 | 01d6ad91-4edd-41df-b449-07f038c564a6 | 2016-11-14 | 370 | 4 |
| 17 | 03330FE8-6265-42AE-A1BA-23B7ACC885FE | 2016-11-07 | 370 | 1 |
| 18 | 037753cd-3221-4aa3-b6bb-60b325b441Bb | 2016-11-17 | 364 | 8 |
| 19 | 039e0b18-8dfb-4be0-a278-6121cca6bf4d | 2016-11-16 | 356 | 3 |
| 20 | 01d73490-2f5b-4e71-8954-7d29e348eec4 | 2016-11-17 | 347 | 1 |
| 21 | 0222b07c-05de-42f0-8b49-2c8f40339908e | 2016-11-14 | 343 | 6 |
| 22 | 037777e23-2743-48ec-a96d-029a7ff4e594 | 2016-11-15 | 321 | 1 |
| 23 | 03d46d0e-1da6-47f9-a4e4-90fc0cc34926 | 2016-11-11 | 319 | 6 |
| 24 | 0332907e-d56b-4ced-bef4-13f56bb91d72 | 2016-11-15 | 315 | 7 |
| 25 | 020d2c7b-97fe-4fff-b469-2bac9c7701a8 | 2016-11-15 | 303 | 10 |
| 26 | 03b75c6d-ce43-468e-8a35-4797acc1e054 | 2016-11-13 | 299 | 3 |
| 27 | 01c0d1b3-97b1-4827-9f8a-939825254b6 | 2016-11-09 | 294 | 1 |
| 28 | 0332907e-d56b-4ced-bef4-13f56bb91d72 | 2016-11-12 | 292 | 4 |
| 29 | 04a5a98f-9118-4bc5-85c3-c0a01e21cbdf | 2016-11-15 | 290 | 7 |
| 30 | 01d6ad91-4edd-41df-b449-07f038c564a6 | 2016-11-13 | 287 | 3 |
| 31 | 01adedb7-5d5e-4f0c-abe2-4919573fc9f5 | 2016-11-09 | 286 | 3 |
| 32 | 01de3ae5-6627-4096-a250-1afe427c5059 | 2016-11-10 | 286 | 1 |
| 33 | 02045CE1-BDD4-4335-B7ED-1252B1588076 | 2016-11-02 | 279 | 1 |
| 34 | 020d2c7b-97fe-4fff-b469-2bac9c7701a8 | 2016-11-07 | 273 | 4 |
| 35 | 02dcafa4-212b-492e-8438-e92ab7093b27 | 2016-11-16 | 270 | 5 |

FIG. 4A

| | time | location | line_dist(meter) | line_speed(mph) |
|---|---|---|---|---|
| 1 | 13:38 | 40.709361,-74.014702 | -1 | -1.0 |
| 2 | 13:39 | 40.7113,-74.014191 | 218 | 9.0 |
| 3 | 13:39 | 40.71262,-74.014008 | 148 | 22.0 |
| 4 | 13:41 | 40.714611,-74.013588 | 224 | 5.3 |
| 5 | 13:41 | 40.71608,-74.01313 | 168 | 10.4 |
| 6 | 13:42 | 40.717781,-74.012589 | 195 | 24.2 |
| 7 | 13:42 | 40.71867,-74.012321 | 101 | 18.9 |
| 8 | 13:43 | 40.720211,-74.012001 | 173 | 7.8 |
| 9 | 13:43 | 40.72134,-74.011726 | 128 | 28.6 |
| 10 | 13:43 | 40.72245,-74.011574 | 124 | 27.8 |
| 11 | 13:43 | 40.723572,-74.011307 | 127 | 28.4 |
| 12 | 13:43 | 40.724522,-74.011108 | 107 | 23.9 |
| 13 | 13:45 | 40.725609,-74.010818 | 123 | 3.9 |
| 14 | 13:45 | 40.726768,-74.010658 | 130 | 29.0 |
| 15 | 13:45 | 40.72802,-74.010498 | 140 | 31.3 |
| 16 | 13:45 | 40.728981,-74.010391 | 107 | 24.0 |
| 17 | 13:45 | 40.7304,-74.010323 | 158 | 23.5 |
| 18 | 13:45 | 40.731441,-74.010231 | 116 | 26.0 |
| 19 | 13:46 | 40.732449,-74.010139 | 112 | 25.1 |
| 20 | 13:46 | 40.733631,-74.01001 | 132 | 29.5 |
| 21 | 13:46 | 40.734879,-74.009888 | 139 | 31.1 |
| 22 | 13:46 | 40.73597,-74.009781 | 122 | 27.2 |
| 23 | 13:46 | 40.736969,-74.00972 | 111 | 24.9 |
| 24 | 13:47 | 40.738071,-74.009727 | 123 | 5.0 |
| 25 | 13:47 | 40.739021,-74.009842 | 106 | 23.7 |
| 26 | 13:48 | 40.73991,-74.009499 | 103 | 23.0 |
| 27 | 13:48 | 40.740879,-74.008972 | 117 | 26.1 |
| 28 | 13:49 | 40.741928,-74.008743 | 118 | 5.3 |
| 29 | 13:49 | 40.742569,-74.007889 | 101 | 5.7 |
| 30 | 13:50 | 40.743771,-74.007042 | 152 | 11.7 |
| 31 | 13:50 | 40.74464,-74.006363 | 112 | 15.7 |
| 32 | 13:50 | 40.74548,-74.005791 | 105 | 11.8 |
| 33 | 13:51 | 40.746521,-74.005043 | 132 | 11.8 |
| 34 | 13:52 | 40.74733,-74.00444 | 103 | 3.1 |
| 35 | 13:54 | 40.74815,-74.003853 | 104 | 2.1 |

FIG. 4B

| | uid | home | key_places_count | matched_bb_count | |
|---|---|---|---|---|---|
| 1 | 00588312-ba52-4714-8482-f9e8d0299092 | 37.68191762,-122.13175233 | 11 | 57 | 37.69819548981296,-122.12921 |
| 2 | 09773d0f-bef3-4d90-9247-8dea96699918 | 37.6812504,-122.122151 | 2 | 79 | 37.783114,-122.460049,37.786 |
| 3 | 20428301-7fcb-41c6-b3cb-b237546555b0 | 37.65091227,-122.07858229 | 20 | 107 | 37.827076,-122.285131,37.723 |
| 4 | 12a68697-19ac-4c2c-8b31-c71c0ecdc75a | 37.78906492,-122.23116015 | 1 | 27 | 38.029791,121.308445, |
| 5 | 17883c3c-e41c-4d3e-b7c2-18de4a638a21 | 37.40874478,-121.93640059 | 19 | 156 | 37.782341,-122.41,37.413683, |
| 6 | 178c8f41-1137-4043-be3d-379e12d83ad8 | 37.72437367,-122.14922682 | 3 | 32 | 37.72578,-122.15607,37.78013 |
| 7 | 125519c-ed6e-4088-aca1-152cbe13c54 | 37.86234994,-122.27772237 | 4 | 28 | 37.623463,-122.126096,37.623 |
| 8 | 1192aa38-9137-4277-a2be-04f09ab38b53 | 37.60155152,-122.02271686 | 8 | 61 | 37.65107284686,-122.100877 |
| 9 | 1ae27831-313f-49cc-8276-09449a2b0f251 | 37.74379956,-122.17860856 | 8 | 41 | 37.684517,-122.073684,37.786 |
| 10 | 0485a52e-638a-4cba-b340-445e6327e296 | 37.66845188,-122.13173292 | 36 | 82 | 37.993962,-122.115705,37.998 |
| 11 | 05628759-5e82-4430-ab28-e0d2cc9064f03 | 37.534493766,-121.95955893 | 23 | 36 | 37.549624,-122.047922,37.533 |
| 12 | 1fd59e23-7f6c-47da-a81c-078e24f9bc5c | 37.678837453,-122.066833 | 2 | 62 | 37.816582,-122.282482,37.745 |
| 13 | 02a91338-dcc7-4f3e-9636-d5a1d7797c49f | 37.358808679,-121.898729079 | 7 | 28 | 37.358321,-121.88016,37.3484 |
| 14 | 0970558a-01ed-40cc-a639-a685b8ac0a90 | 37.652899,-122.09723037 | 3 | 63 | 37.77755593,-122.42038344,37.5 |
| 15 | 0184eab3-d387-4c40-b7b7-ad66b7c9d910 | 37.314676,-121.968844 | 18 | 60 | 37.9536360283283,-122.33512 |
| 16 | 20d46df0-fdc1-4202-872a-22a6344f1855f | 37.77323456,-122.210999 | 22 | 111 | 37.54874,-122.32042,37.75563 |
| 17 | 1709a781-a565-46d6-aa2b-09cc52e1e94b | 37.6236116,-122.0517769 | 3 | 45 | 37.59913,-122.01877,37.83459 |
| 18 | 0a0b4531-fe60-40ea-aed6-0feed1aa6e0 | 37.79036416,-122.19657591 | 12 | 118 | 37.80988814144957,-122.41019 |
| 19 | 237fdd25-8eb6-4d65-96e2-1ed81bba4b16 | 37.72967656,-122.18105833 | 4 | 11 | 37.72939797770036,-122.17998 |
| 20 | 1552c480-6ade-43ee-b8ba-947c742e0e58 | 37.63986519,-122.0813163 | 4 | 12 | 37.79487,-122.27042,37.79456 |
| 21 | 09a08444c-be91-4b6c-a53a-b213db543bf3 | 37.38028638,-121.879990573 | 6 | 121 | 37.794473,-122.39483,37.7955 |
| 22 | 1ea60757-5115-48a6-b40f-31f0c5c510fd | 37.96582575,-122.35010418 | 35 | 85 | 37.6523,-122.13981,37.974694 |
| 23 | 01e8aac1-a711-4d04-8697-be470445b1b7 | 37.78816604,-122.20608564 | 4 | 26 | 37.48496,-121.92775,37.48494 |
| 24 | 10e43942-c488-4268-bcec-71e9c655ad03 | 37.72961712,-122.38387285 | 5 | 67 | 37.65306094756663,-122.10187 |
| 25 | 0236d396-9d35-45d7-9a59-fb684bc9bced | 37.5311407,-122.00809337 | 22 | 51 | 37.46713,-121.925,37.37930024 |
| 26 | 05727138c-0723-4a0a-ad55-cbf30304bf1f2 | 37.95561244,-122.34413856 | 4 | 33 | 37.76931,-122.259887,37.8478 |
| 27 | 0ad7d474-4d02-4f83-9260-0bccb56c8be5 | 37.69337231,-122.096791 | 2 | 20 | 37.76931,-122.259887,37.8959 |
| 28 | 0ba8e200-c8fe-47b4-9016-1b977ce5fe9d | 37.5720926,-122.0157806 | 6 | 29 | 37.75027768b5178,-122.20286 |
| 29 | 20f65846-4ca9-414a-9271-8f6f42d6ef1e | 37.64036035,-122.08327188 | 2 | 12 | 37.79456,-122.27384,37.77124 |
| 30 | 24861ed25d149330d81158717324c0f15221a627 | 37.33535335,-121.838997 | 6 | 21 | 37.80445,-122.27239,37.80281 |
| 31 | 2499d2a-ebb6-4057-80da-5f74a337770e | 37.59219977,-122.08280152 | 30 | 21 | 37.8006732,-122.271207,37.8 |
| 32 | 1a5ccd5e-808a-4301-852c-84d595f9f82c | 37.78007113,-122.2230698 | 6 | 57 | 37.63809,-122.11757,37.78301 |
| 33 | 13bbb029-e13e-4a51-b727-00c1cf2a4859 | 37.69078139,-122.14916332 | 11 | 48 | 37.704511,-122.125572,37.638 |

FIG. 6A

| | billboard_location | users_count |
|---|---|---|
| 1 | 37.770233,-122.407313 | 2448 |
| 2 | 37.7522,-122.20518 | 3488 |
| 3 | 37.718194,-122.208607 | 30 |
| 4 | 37.997315,-122.132508 | 448 |
| 5 | 37.699956,-122.489358 | 194 |
| 6 | 37.763317,-122.38854 | 575 |
| 7 | 37.62268,-122.41264 | 581 |
| 8 | 37.749578,-122.20052 | 144 |
| 9 | 37.775627,-122.446248 | 690 |
| 10 | 37.785381,-122.190346 | 4111 |
| 11 | 38.006633,-122.545801 | 12 |
| 12 | 37.459232,-122.138212 | 3043 |
| 13 | 37.942474,-122.362713 | 137 |
| 14 | 37.781313,-122.462907 | 257 |
| 15 | 38.139151,-122.253979 | 44 |
| 16 | 37.503817,-122.244066 | 2872 |
| 17 | 37.79018,-122.393913 | 2892 |
| 18 | 37.771913,-122.190084 | 472 |
| 19 | 37.816321,-122.245755 | 75 |
| 20 | 37.816599,-122.271923 | 2746 |
| 21 | 37.803407,-122.234289 | 4876 |
| 22 | 37.660893,-122.404602 | 2650 |
| 23 | 37.782888,-122.412108 | 1999 |
| 24 | 37.776439,-122.394295 | 1609 |
| 25 | 37.301959,-121.949717 | 460 |
| 26 | 37.799408,-122.440811 | 593 |
| 27 | 37.922429,-122.317261 | 1847 |
| 28 | 37.80019,-122.248515 | 285 |
| 29 | 38.151835,-122.447809 | 111 |
| 30 | 37.939499,-122.347709 | 709 |
| 31 | 38.051665,-122.530515 | 360 |
| 32 | 37.817976,-122.244758 | 66 |
| 33 | 37.789743,-122.404346 | 1943 |
| 34 | 37.791719,-122.391783 | 1129 |

Billboard table
Billboard location and users associated with it.

Click it will:
1. Make the map set at the selected billboard.
2. Users table will show users associated with the billboard.

FIG. 6B

| Cluster/Parcel ID | ... | 2016/10/15 6:00-7:00 | 2016/10/15 7:00-8:00 | ... | 2016/10/15 19:00-20:00 | 2016/10/15 20:00-21:00 | ... |
|---|---|---|---|---|---|---|---|
| ... | ... | ... | ... | ... | ... | ... | ... |
| a2xxxxxx | ... | 1 | 1 | ... | 1 | 0 | ... |
| g1xxxxxx | ... | 0 | 1 | ... | 0 | 0 | ... |
| h6xxxxxx | ... | 0 | 0 | ... | 0 | 0 | ... |
| u9xxxxxx | ... | 0 | 0 | ... | 0 | 1 | ... |
| c3xxxxxx | ... | 0 | 0 | ... | 1 | 1 | ... |
| ... | ... | ... | ... | ... | ... | ... | ... |

FIG. 8C

METHOD AND APPARATUS FOR DELIVERING PUBLICLY DISPLAYED INFORMATION TO MOBILE DEVICES BASED ON LOCATION HISTORY

CROSS REFERENCE TO RELATED APPLICATIONS

The present application claims priority to U.S. Provisional Application No. 62/441,433, filed Jan. 1, 2017, entitled "Method and Apparatus for Delivering Publicly Displayed Information to Mobile Devices based on Mobile User Travel Routes," U.S. Provisional Application No. 62/441,435, filed Jan. 1, 2017, entitled " Method and Apparatus for Delivering Publicly Displayed Information to Mobile Devices based on User Travel Routes and Travel Speeds," and U.S. Provisional Application No. 62/441,436, filed Jan. 1, 2017, entitled "Method and Apparatus for Real-Time Delivery of Publicly Displayed Information to Mobile Devices." Each of the above applications is incorporated herein by reference in its entirety. The present application is related to commonly-owed U.S. Patent Application entitled "Method and Apparatus for Real-Time Delivery of Publicly Displayed Information to Mobile Devices," filed on even date herewith, and commonly-owed PCT Application entitled "Method and Apparatus for Delivering Publicly Displayed Information to Mobile Devices," filed on even date herewith, each of which is incorporated herein by reference in its entirety.

DESCRIPTION OF RELATED ART

The present application is related to mobile advertising and more particularly to method and system for delivering publicly displayed information to mobile devices based on associated location history.

BACKGROUND

Organizations have been displaying information to the public using large signs such as posters, billboards, etc., for a long time. Billboards are panels or structures displaying information or messages, and come in different forms and sizes. Larger sized billboards, such as those shown in FIGS. 1A and 1B are usually placed along roads and streets, and on structures such as poles and sides of buildings, to allow people traveling by to catch glimpses of them. Smaller billboards, signs, posts or displays, such as the ones shown in FIG. 1C, are usually placed on structures such as walls and bus stands so passersby can see them. Typically showing witty slogans and distinctive visuals, these signs are designed to catch a person's attention and create an impression very quickly. Yet, the impression is usually fleeting unless it is repeated. Often, people pass by these billboards, signs or posts and become interested in their displayed messages but do not retain enough information to follow up on their interests.

DESCRIPTION OF THE DRAWINGS

FIGS. 4A and 4B are tables illustrating examples of some of the content in the location database according to certain embodiments.

FIGS. 6A to 6C are screenshots of a graphic user interface for displaying the content of the association database according to certain embodiments.

FIG. 8C is a table illustrating hourly aggregation of location data signals associated with a mobile device according to certain embodiments.

DESCRIPTION OF THE EMBODIMENTS

Embodiments of the present application improve upon traditional signage systems by providing the technology to identify mobile devices whose users are likely to have traveled by certain billboards, signs, posts or points of interests and to deliver information relevant to the certain billboards, signs, posts or points of interests to these mobile devices so as to create additional impressions. The information can also provide the users of the mobile devices easy access to the displayed information, or to provide directions and information about the points of interests on the mobile users' regular routes between their key places such as homes and offices.

The present application is related to mobile advertising. Mobile advertising comes from, and is integral to, the development and widespread use of computer technology. Many smartphone software and application developers depend on advertising revenue to fund their efforts. To take advantage of the mobile nature of mobile phones, sophisticated technologies have been developed to estimate mobile device locations based on the signals they send and to deliver precise, relevant, and timely information to the mobile devices based on their estimated locations. Thus, mobile advertising technology is computer technology and has only been performed using computers with specifically designed software components. The techniques presented herein take advantage of big advertising data, especially highly accurate location information of mobile users, and use them to identify mobile user's home/office locations anonymously. Embodiments of the present application also provide methods and apparatus to estimate mobile user travel routes and to provide information displayed along a public road to users of mobile devices who are likely to have been exposed to the information while traveling on the pubic road based on their estimated travel routes. Thus, business owners can understand their customers and provide information to relevant customers more efficiently.

Figure 1B:
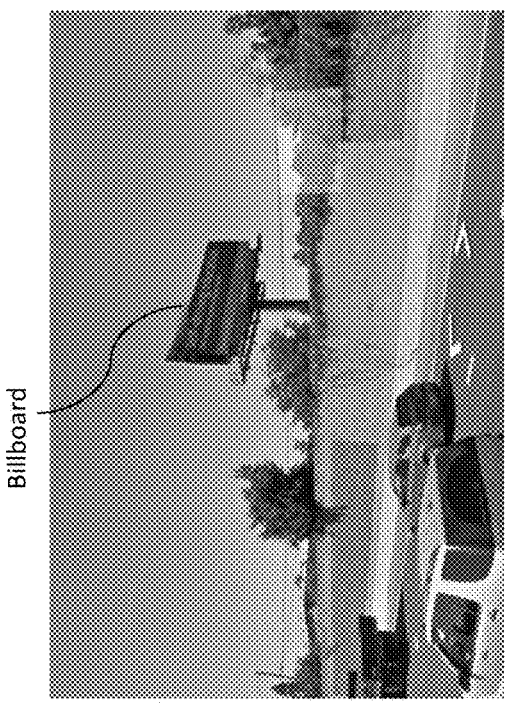
FIGS. 1A-1C are pictures showing examples of billboards or posters disposed by public roads or pedestrian walkways.
Figure 1C:
Figure 1A:
Figure 1D:
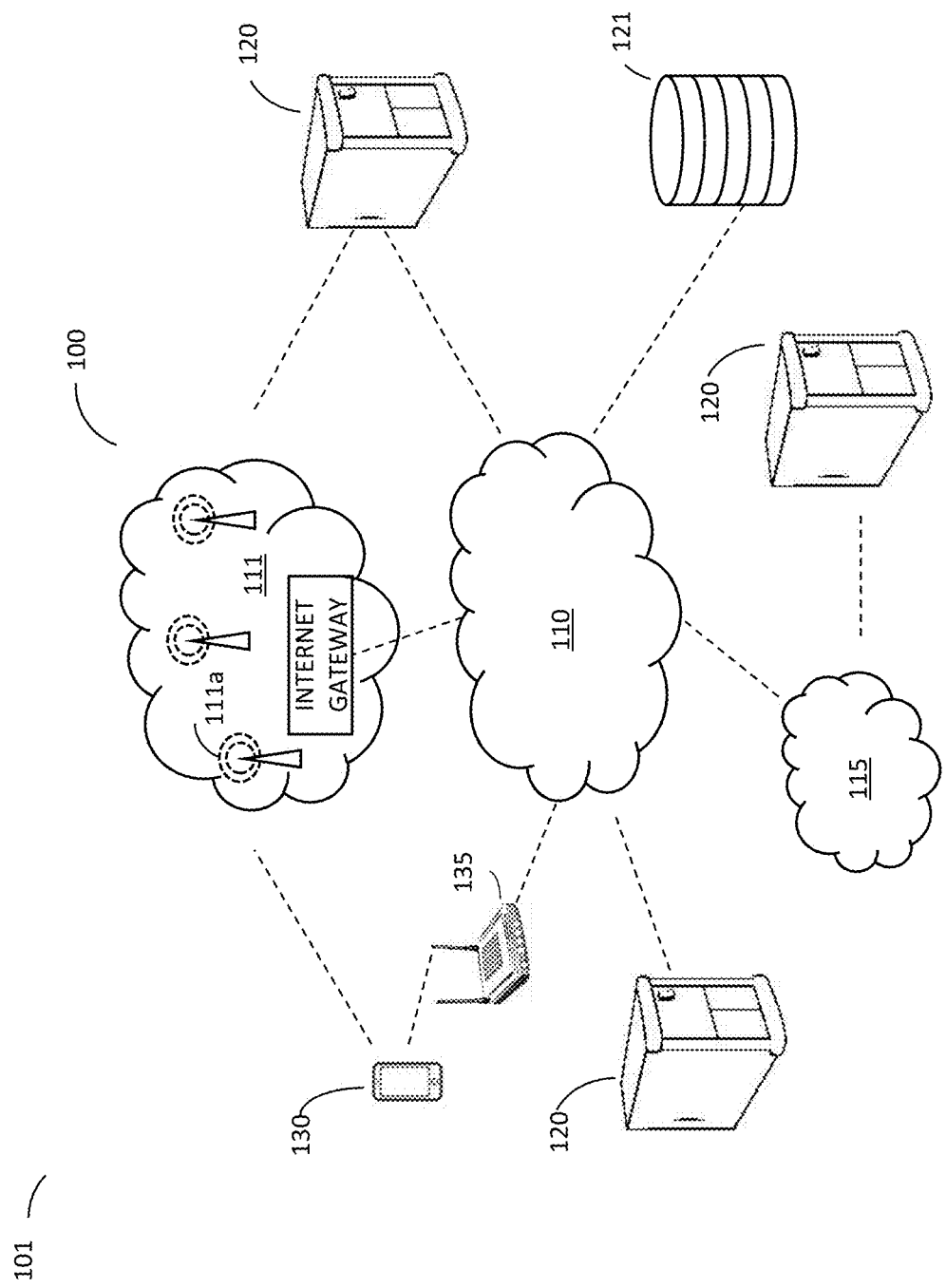
FIG. 1D is a schematic diagram illustrating an overview of an environment in which some embodiments of the disclosed technology may operate.

FIG. 1D is a schematic diagram illustrating an overview of an environment 101 in which some embodiments of the disclosed technology may operate. Environment 101 can include one or more computer systems 120 coupled to a packet-based network 100. The packet-based network 100 in certain embodiments includes the Internet 110 and part or all of a cellular network 111 coupled to the Internet 110 via an Internet Gateway. The computers/servers 120 can be coupled to the Internet 110 using wired Ethernet and optionally Power over Ethernet (PoE), WiFi, and/or cellular connections via the cellular network 111 including a plurality of cellular towers 111a. The network may also include one or more network attached storage (NAS) systems 121, which are computer data storage servers connected to a computer network to provide data access to a heterogeneous group of clients. As shown in FIG. 1D, one or more mobile devices 130 such as smart phones or tablet computers are also coupled to the packet-based network via cellular connections to the cellular network 111. When a WiFi hotspot (such as hotspot 135) is available, a mobile device 130 may connect to the Internet 110 via a WiFi hotspot 135 using its built-in WiFi connection. Thus, the mobile devices 130 may interact with other computers/servers coupled to the Internet 110.

The computers/servers 120 can include server computers, client computers, personal computers (PC), tablet PC, set-top boxes (STB), personal digital assistant devices (PDA), web appliances, network routers, switches or bridges, or any computing devices capable of executing instructions that specify actions to be taken by the computing devices. As shown in FIG. 1D, some of the computers/servers 120 are coupled to each other via a local area network (LAN) 115, which in turn is coupled to the Internet 110. Also, each computer/server 120 referred herein can include any collection of computing devices that individually or jointly execute instructions to serve as a script file server, as described in further detail below.

Figure 2A:
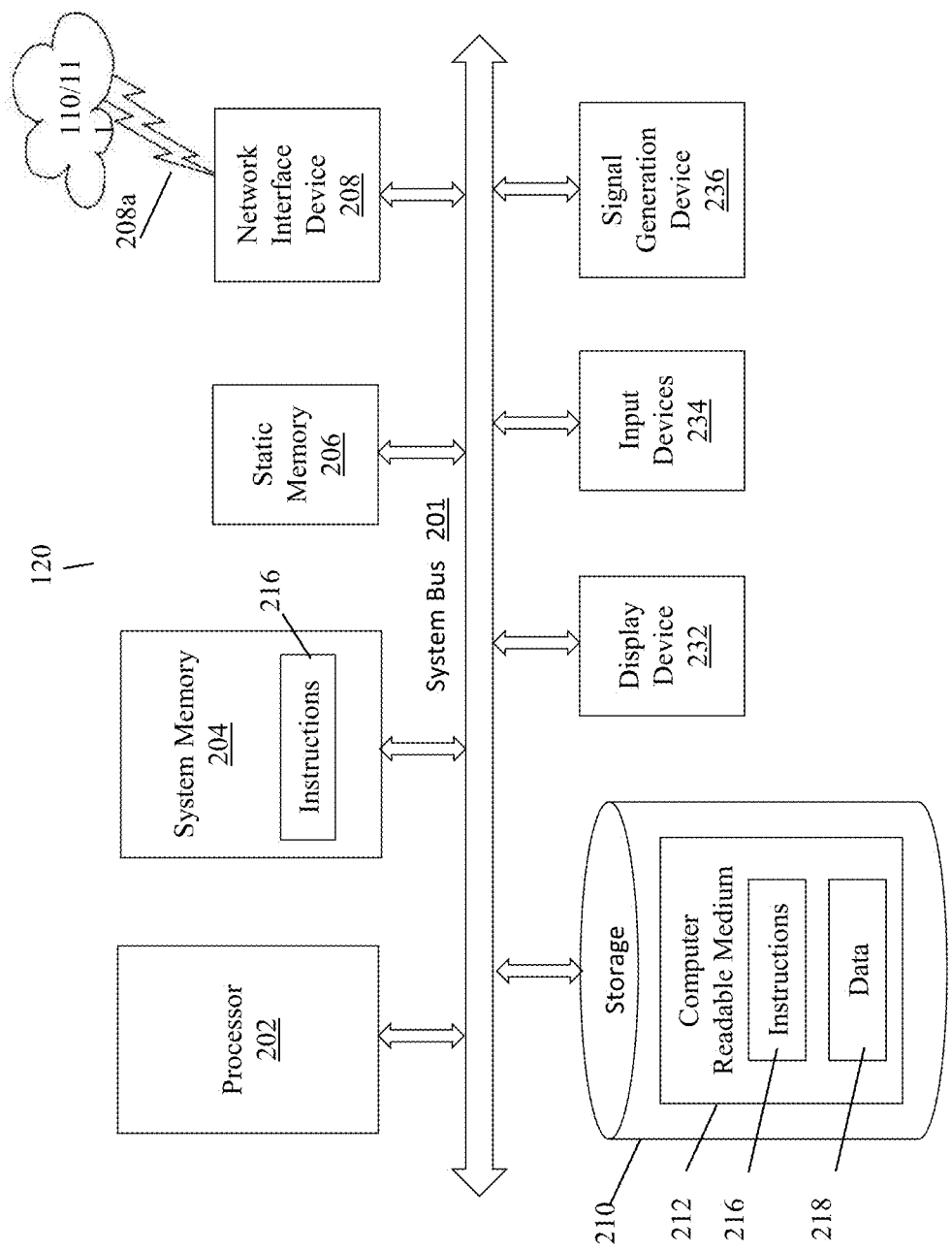
FIG. 2A is a diagrammatic representation of a computer/server coupled to a network that can be used to implement the disclosed technology according to certain embodiments.

FIG. 2A is a diagrammatic representation of one of the computer systems 120 in the environment 101, which can be used to implement the technologies according to certain embodiments. The computer/server 120 may operate as a standalone device or as a peer computing device in a peer-to-peer (or distributed) network computing environment. As shown in FIG. 2, the computer/server 120 includes one or more processors 202 (e.g., a central processing unit (CPU), a graphic processing unit (GPU), and/or a digital signal processor (DSP)) and a system or main memory 204 coupled to each other via a system bus 201. The computer/server 120 may further include static memory 206, a network interface device 208, a storage unit 210, one or more display devices 230, one or more input devices 234, and a signal generation device (e.g., a speaker) 236, with which the processor(s) 202 can communicate via the system bus 201.

In certain embodiments, the display device(s) 230 include one or more graphics display units (e.g., a plasma display panel (PDP), a liquid crystal display (LCD), a projector, or a cathode ray tube (CRT)). The input device(s) 234 may include an alphanumeric input device (e.g., a keyboard), a cursor control device (e.g., a mouse, trackball, joystick, motion sensor, or other pointing instrument). The storage unit 210 includes one or more machine-readable media 212 which store computer program instructions 216 (e.g., software), such as computer program instructions that enable anyone or more of the systems, methodologies or functions described herein. The storage unit 210 may also store data 218, such as the data used and/or generated by the systems, methodologies or functions in the disclosed embodiments. The instructions 216 (e.g., software) may be loaded, completely or partially, within the main memory 204 or within the processor 202 (e.g., within a processor's cache memory) during execution thereof by the computer/server 120. Thus, the main memory 204 and the processor 202 also constitute machine-readable media.

While machine-readable medium 212 is shown in an exemplary embodiment to be a single medium, the term "machine-readable medium" should be taken to include a single medium or multiple media (e.g., a centralized or distributed database, or associated caches and servers) able to store instructions and data. The term "machine-readable medium" shall also be taken to include any medium that is capable of storing instructions (e.g., instructions 216) for execution by the computer/server 120 and that cause the computing device to perform anyone or more of the methodologies disclosed herein. The term "machine-readable medium" includes, but not be limited to, data repositories in the form of solid-state memories, optical media, and magnetic media. In certain embodiments, the instructions 216 and/or data 218 can be stored in the network 100 and accessed by the computer/server 120 via its network interface device 208, which provides wired and/or wireless connections to a network, such as a local area network 115 and/or a wide area network (e.g., the Internet 110) via some type of network connectors 280a. The instructions 216 (e.g., software) and or data 218 may be transmitted or received via the network interface device 208.

Mobile device 130 represents millions and millions of mobile devices communicating with the network 100. The computers/servers 120 coupled to the Internet may include one or more publishers that interact with the mobile devices running apps provided by the publishers. The publishers, as they interact with the mobile devices, generate mobile supplies, in the form of information requests transmitted in data packets. Each information request carries request data including characteristics of an associated mobile device, certain information about its user, and raw non-downgraded location data indicating the location thereof. The publishers may post the mobile supplies on webpages for bidding by, for example, advertisers or their agents, or transmit the mobile supplies to an ad agent or ad middleman for fulfillment, or fulfill the supplies themselves. Some mobile devices may also have certain types of background applications (apps) installed and running to provide mobile supplies in the form of, for example, automatic location update signals or location updates, periodically to those contracted to receive the updates.

As more and more mobile supplies (e.g., ad requests, location updates, etc.) are generated and collected by various parties coupled to the network 100, the data in the mobile supplies can be processed to produce statistical results about the mobile users and to predict mobile user behaviors, which, when combined with real-time data, can be used by the information providers to serve more relevant information to the mobile users. In certain embodiments, routine travel routes of mobile users are derived in an offline process from location data associated with their respective mobile devices, which are used to associate publicly displayed information with the mobile users or their mobile devices, as discussed further below.

Figure 2B:
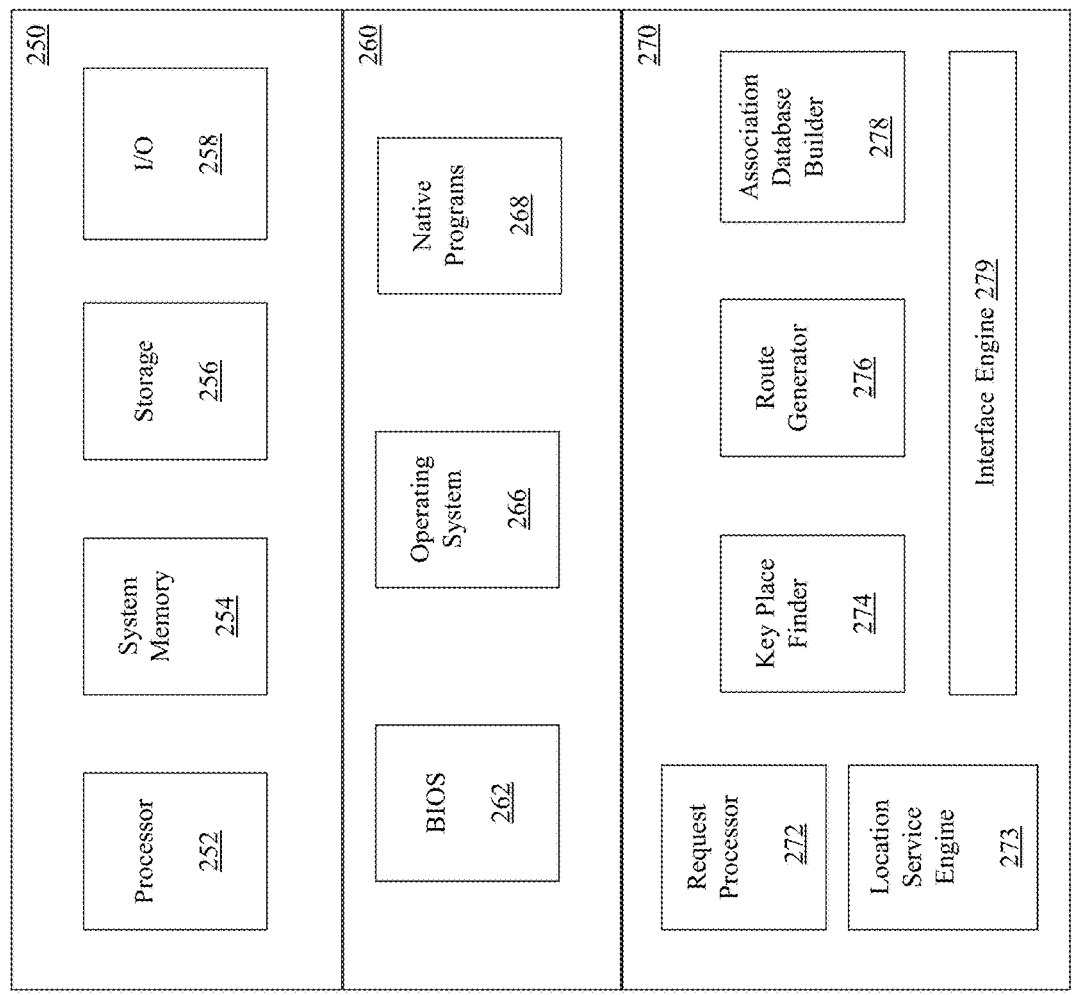
FIG. 2B is a block diagram illustrating components in the computer system implementing the disclosed technology.

FIG. 2B is a block diagram illustrating components in a computer system 200 implementing the disclosed technology according to certain embodiments. The computer system 200 may include one or more computers/servers 120 coupled to each other via a local network (e.g., network 115) and/or wide area network (e.g., network 110). As shown in FIG. 2B, the components include hardware components 250, such as one or more processors 252, one or more system memories 254, one or more storage units 256, and the I/O devices 258. The components further include general software applications 260, such as one or more basic input/output systems (BIOS) 262, one or more operating systems 266, and native programs 268. The components further include proprietary software components 270 specifically designed to implement the disclosed technology together with the other components of the computer system 200, including a request processor 272, a location service engine 273, a key place finder 274, a route generator 276, an association database builder 278, and an interface engine 279.

Figure 2C:
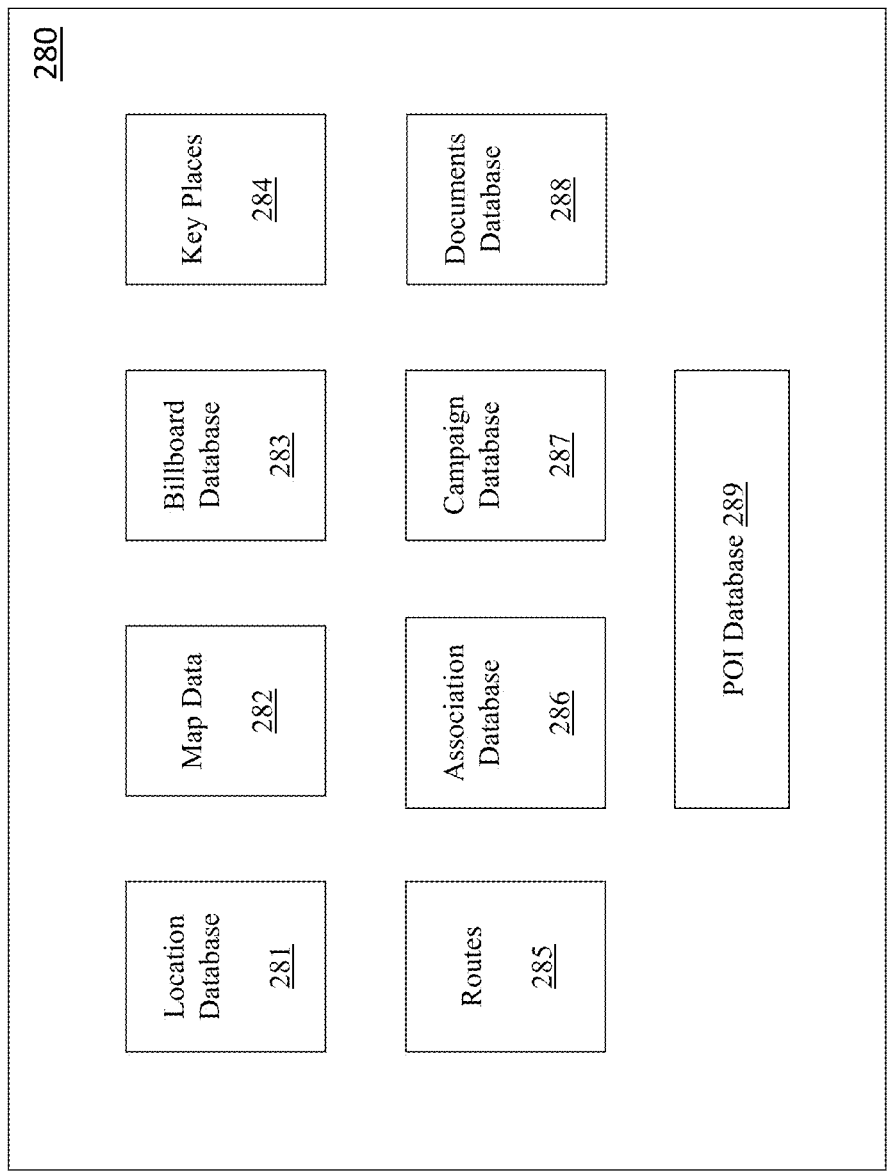
FIG. 2C is a block diagram illustrating data and databases in one or more storage devices associated with the computer system, according to certain embodiments.

FIG. 2C is a block diagram illustrating some of the data stores and/or databases 280 in the one or more storage units 256 of the computer system 200, according to certain embodiments. As shown, the data stores and/or databases 280 include a location database 281 storing therein historical data associated with mobile devices 130 communicating with the network 100, map data 282 including data about public roads in a geographical area, a billboard database 283 storing therein information about billboards (here the term "billboard" refers to billboard, commercial signs, business identifications, posters, electronic display screens and/or speakers, or any structure or means by which information is displayed visually and/or acoustically and/or otherwise to travelers on public roads, or any information thus displayed), a key places database 284 storing therein locations of key places generated by the key place finder 274, a routes database 285 storing therein commute routes generated by the route generator 276, an association database 286 storing therein associations of billboards or POIs to mobile devices (or users), a campaign database 287 storing therein campaign data, a documents database 288 storing therein information documents or links to information documents for delivering to mobile devices 130 based on their locations, and a POI database 289 storing therein information about a plurality of points of interests, e.g., businesses, public facilities, etc. and spatial indices defining the boundaries thereof. The data stores and/or databases 280 can be in a same storage unit or in physically separate storage units. In certain embodiments, the map data 282 also includes data about geographical features such as land parcels, etc. in the geographical area.

Figure 2D:
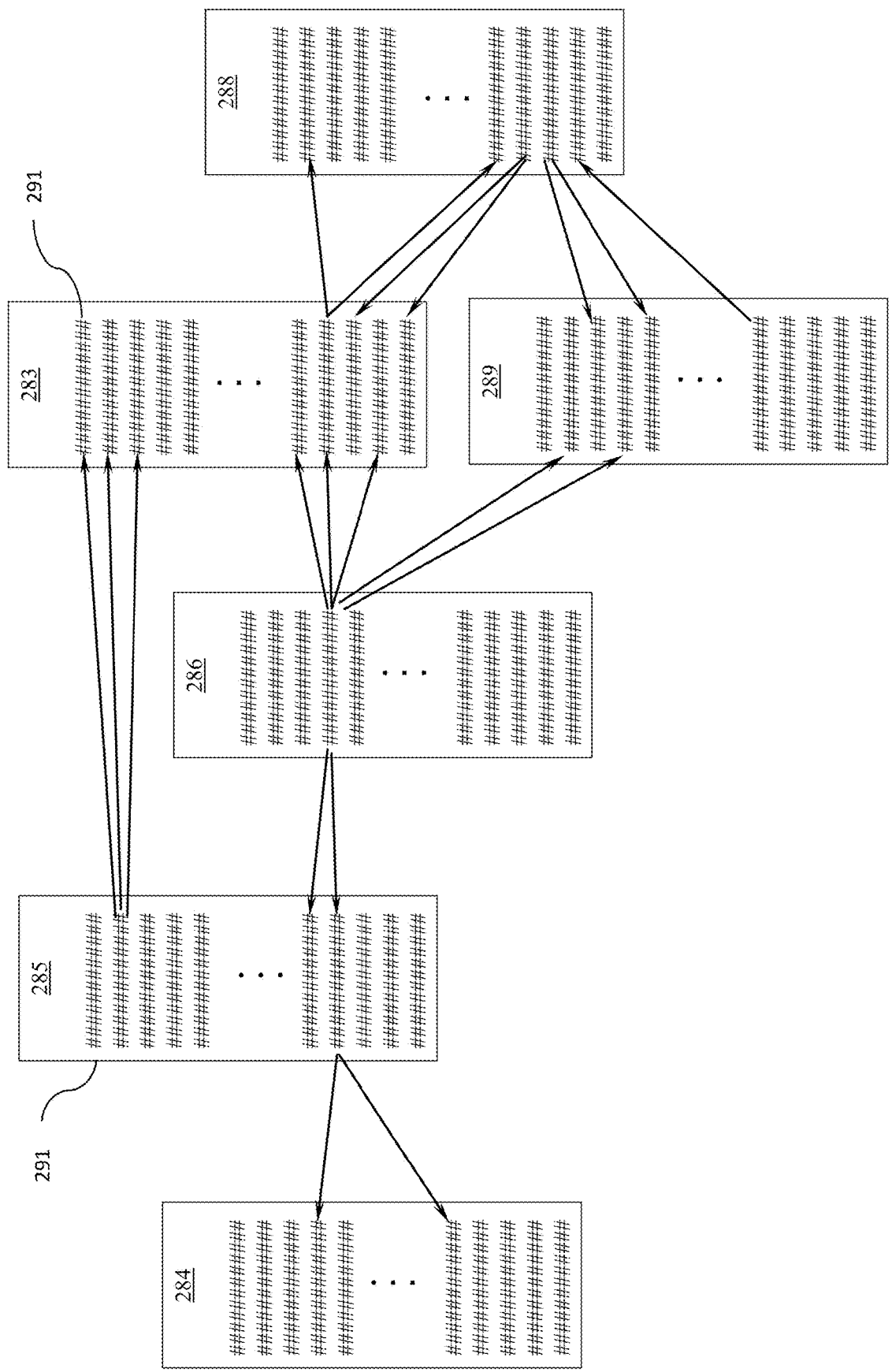
FIG. 2D is a block diagram illustrating schematically the inter-relations among the entries in some of the data stores and/or databases.

FIG. 2D is a block diagram illustrating schematically the inter-relations among the entries in some of the data stores and/or databases 280. As shown in FIG. 2D, each of the databases 283 284, 285, 286, 288 and 289 include many entries 291, and an entry in one database may be related to or point to another entry in another database. For example, each entry in the key places database 284 includes data related to a key place, and each entry in the routes database 285 includes data related to a particular commute route from one place to another and may thus be related to or identify two or more places in the key places database 284. Each route entry in the routes database 285 may also be related to one or more billboards in the billboard database 283, which are billboards displaying information to travelers along the route.

The entries in the documents database 288 correspond to respective information documents or respective links to respective information documents stored in another database in the network 100. In certain embodiments, an information document can be in the form of, for example, an html/JavaScript file. A link to an information document can be, for example, a universal resource location (URL), which the mobile device or publisher can use to fetch the information document. For ease of description, the term "information document" herein means either the information document itself or a link to the information document. In certain embodiments, the documents database 288 includes information documents that are related to respective billboards in the billboards database 283, and/or information documents related to respective POIs in the POI database 289. An information document is related to a billboard if it includes information that's related to at least some of the information displayed on the billboard. For example, if a billboard displays an ad for a shoe brand and includes a picture of a shoe and a slogan such as "Jump, and your life will show up,", an information document related to this billboard may include a picture of a shoe of the same brand with the same slogan, or it may include a picture of a shoe of a competing brand with a similar slogan such as "Step up the games." Either way, the information document is related to the billboard because it is designed to take advantage of mobile users' exposure to the billboard. In certain embodiments, an information document can be related to one or more billboards. For example, more than one billboards may be used to display the same or similar information at different locations. Thus, when the information document is delivered to a mobile device and displayed on the mobile device, it may serve as another impression of the information displayed on the billboards or as a reminder of the information displayed on the billboards. Conversely, each entry in the billboards database 283 may correspond to one or more entries in the documents database 288, as more than one information documents may be created for a particular billboard. In certain embodiments, each entry in the billboards database 283 includes one or more identifications, links or pointers that points to one or more corresponding entries in the documents database.

Each entry in the association database 286 corresponds to a mobile device (or mobile user thereof) and includes associations of the mobile device with one or more billboards in the billboards database 283 and/or one or more POIs in the POI database 289 through the travel routes associated with the mobile user. Alternatively or additionally, the each entry in the association database 286 associates one or more information documents related to the one or more billboards and/or one or more POIs with the mobile device. Thus, each entry in the relational database 286 may point to or identify one or more entries in the documents database 288. Alternatively or additionally, each entry in the relational database 286 points to one or more routes in the routes database 285, each of which relates to or points to one or more entries in the billboard database 283 and/or one or more entries in the POI database 289 and/or one or more entries in the documents database 288.

Figure 3:
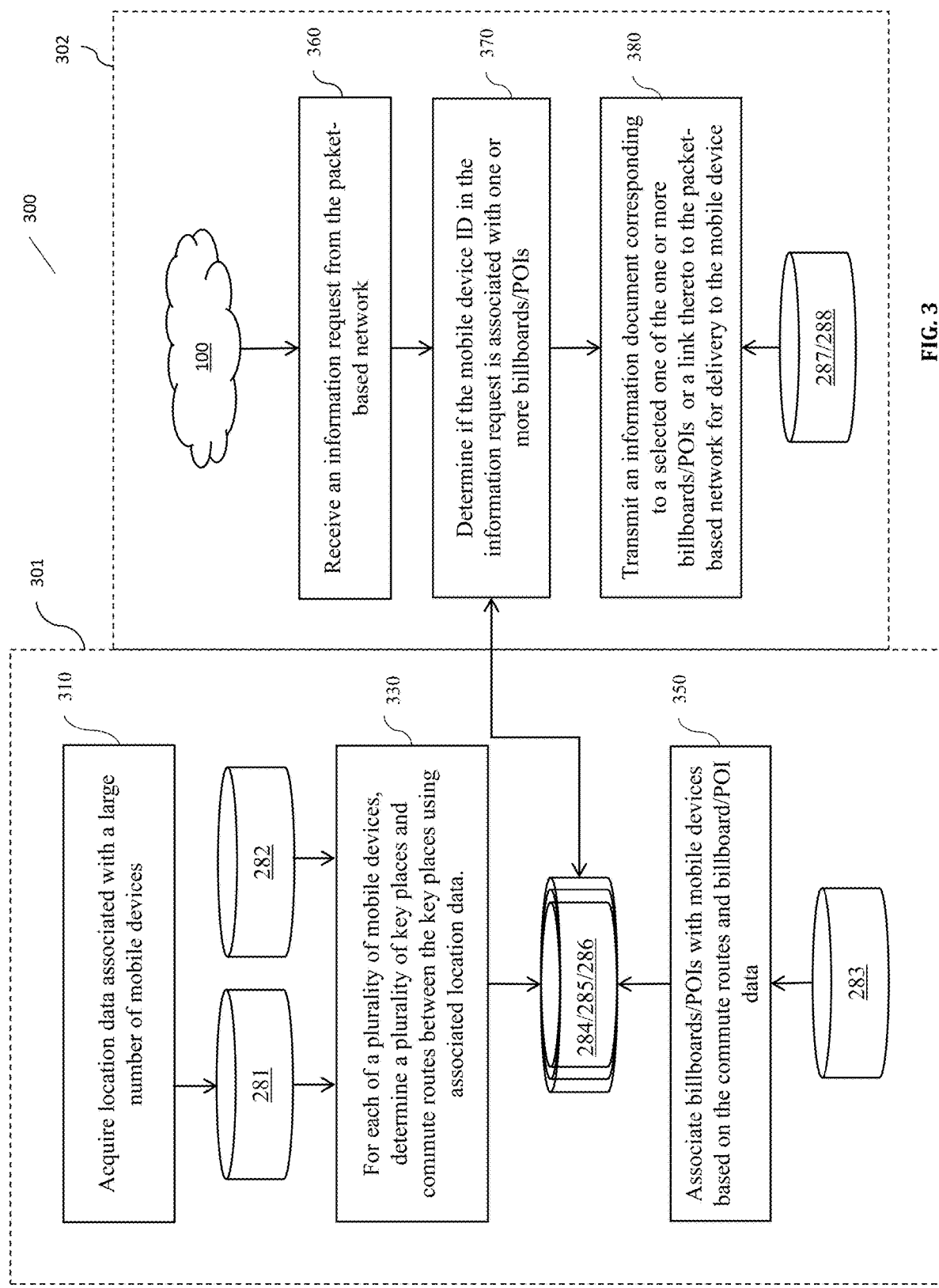
FIG. 3 is a flow diagram illustrating a process for delivering publicly displayed information to mobile devices based on location history according to certain embodiments.

FIG. 3 is a flowchart illustrating a method 300 of one or more components in the computer system 200 to serve location-based information to mobile devices whose users are likely to travel to or have traveled by a location related to the location-based information, according to certain embodiments. As shown in FIG. 3, the method 300 comprises an off-line process 301 and a real time process 302.

In certain embodiments, the offline process 301 includes blocks 310, 330, and 350. At block 310, the location engine 273 acquires and verifies location data and other information associated with a large number of mobile devices in a geographical area, e.g., the San Francisco Bay Area, over the course of, for example, 6 months. The location data and other information associated with the mobile devices can be acquired from the information requests or automatic location updates and are stored in the location database 281. Each information request or location update is transmitted over the network 100 in the form of one or more data packets and is referred to sometimes herein as a location signal. Examples of some of the content in the location database 281 are illustrated in FIGS. 4A and 4B. FIG. 4A shows at a high level, for each of a plurality of mobile devices identified by its User/Mobile Device ID, the date on which the last location signal was received, the number of location signals received, and the number of days in which the location signals were received. Further details of each location signal may also be stored in the location database, including, for example, a time stamp indicating a time the request is formed or sent, mobile device information such as device ID, device type, a name of the operating system used by the device, etc., mobile user information such as a user ID (UID), age, gender, education level, annual income bracket, etc., location information indicating the location of the mobile device when the request is formed such as latitude/longitude (lat/lng) coordinates, IP address of WiFi hot spot (IP) to which the mobile device is coupled at the time of the request, city, state, zip code (zip), indicating a region in which the mobile device is situated, etc. FIG. 4B shows, for a mobile device with a background app installed and running, a series of location updates provided by the background app, together with their associated time stamps, line distances, and line speeds, etc.

At block 330 in the process 301, the key place finder 274 discovers a plurality key places for each of a plurality of mobile devices. The key places for a respective mobile device are where the user of this mobile device routinely spends substantial amounts of time and are discovered using the location data associated with the respective mobile device, as discussed further below. The key places are stored in the key places database 284. Also at block 330, the routes generator 276 estimates commute routes between the key places. The routes can be traced directly from location updates if the mobile device has a background app running while the user is traveling between the key places. The routes can also be estimated based on the key places and map data, as discussed further below. The estimated routes for the respective mobile device are then stored in the routes database 285.

Figure 5:
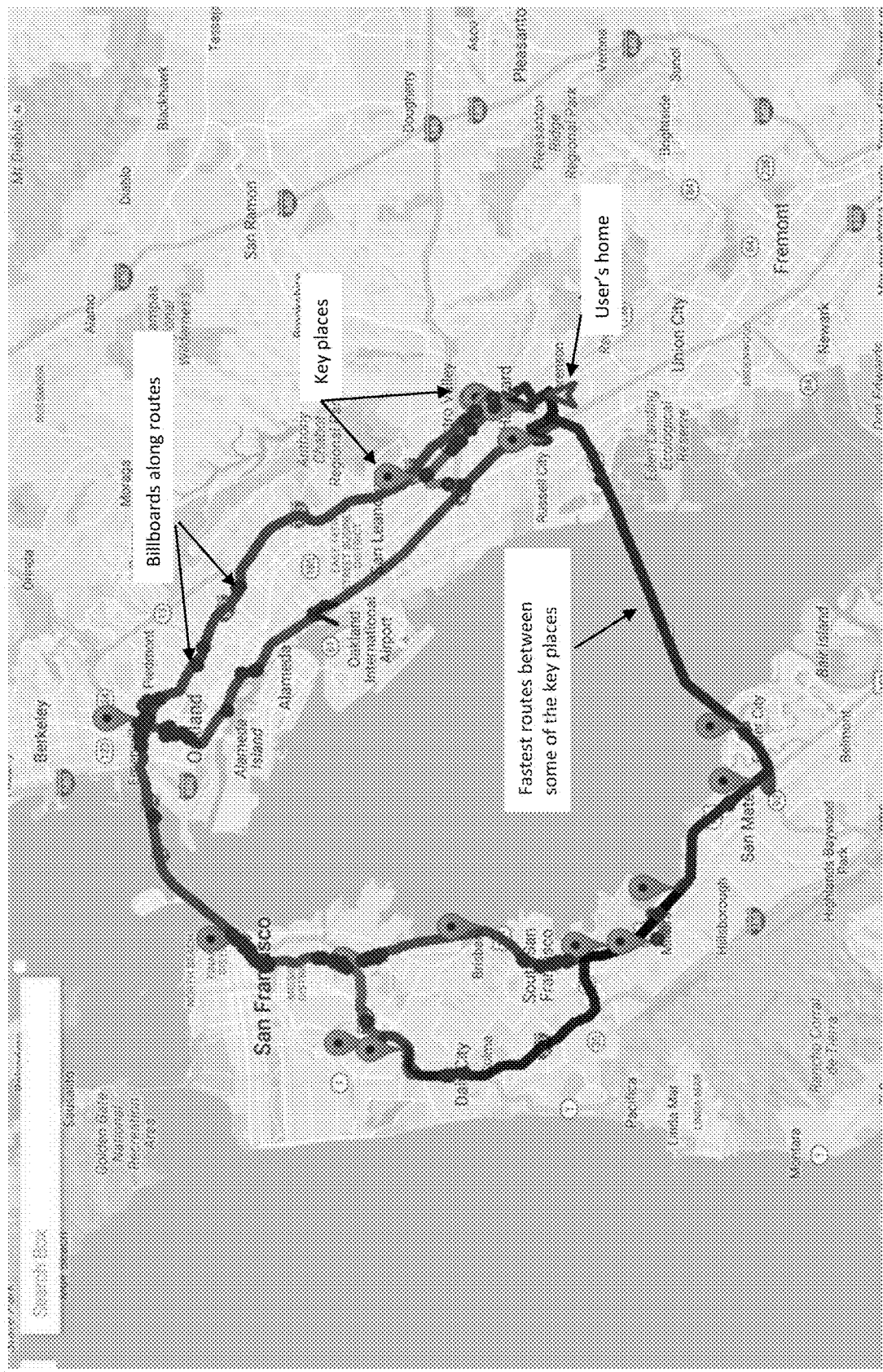
FIG. 5 is a map overlay diagram showing a few key places discovered from location data associated with a particular mobile device according to certain embodiments.

FIG. 5 is a map overlay diagram showing the key places (marked on the map by red balloons) discovered from location data associated with a particular mobile device, including the home of the mobile user (marked on the map by the green triangle) and a few other places around the San Francisco Bay, where the mobile user frequents. FIG. 4 also shows estimated commute routes (marked by thick green lines) among these key places, and billboards (marked by purple dots) along these routes. At block 350, the association database builder 278 identifies at least some of the billboards/POIs along estimated routes from the POI database 289 and/or the billboard database 283, and associates these billboards/POIs with the mobile user in the association database 286.

Figure 6C:
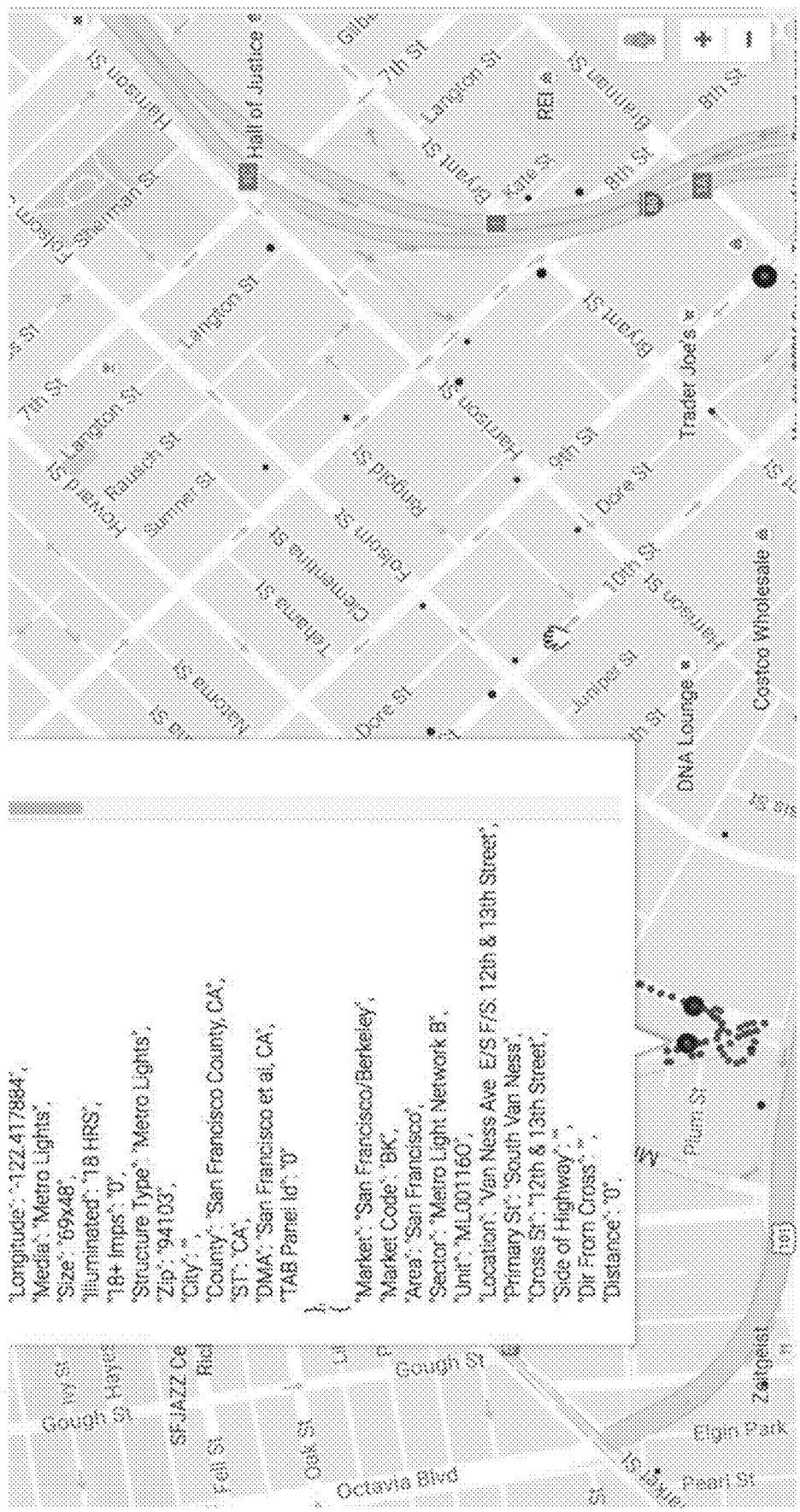
Figure 7:
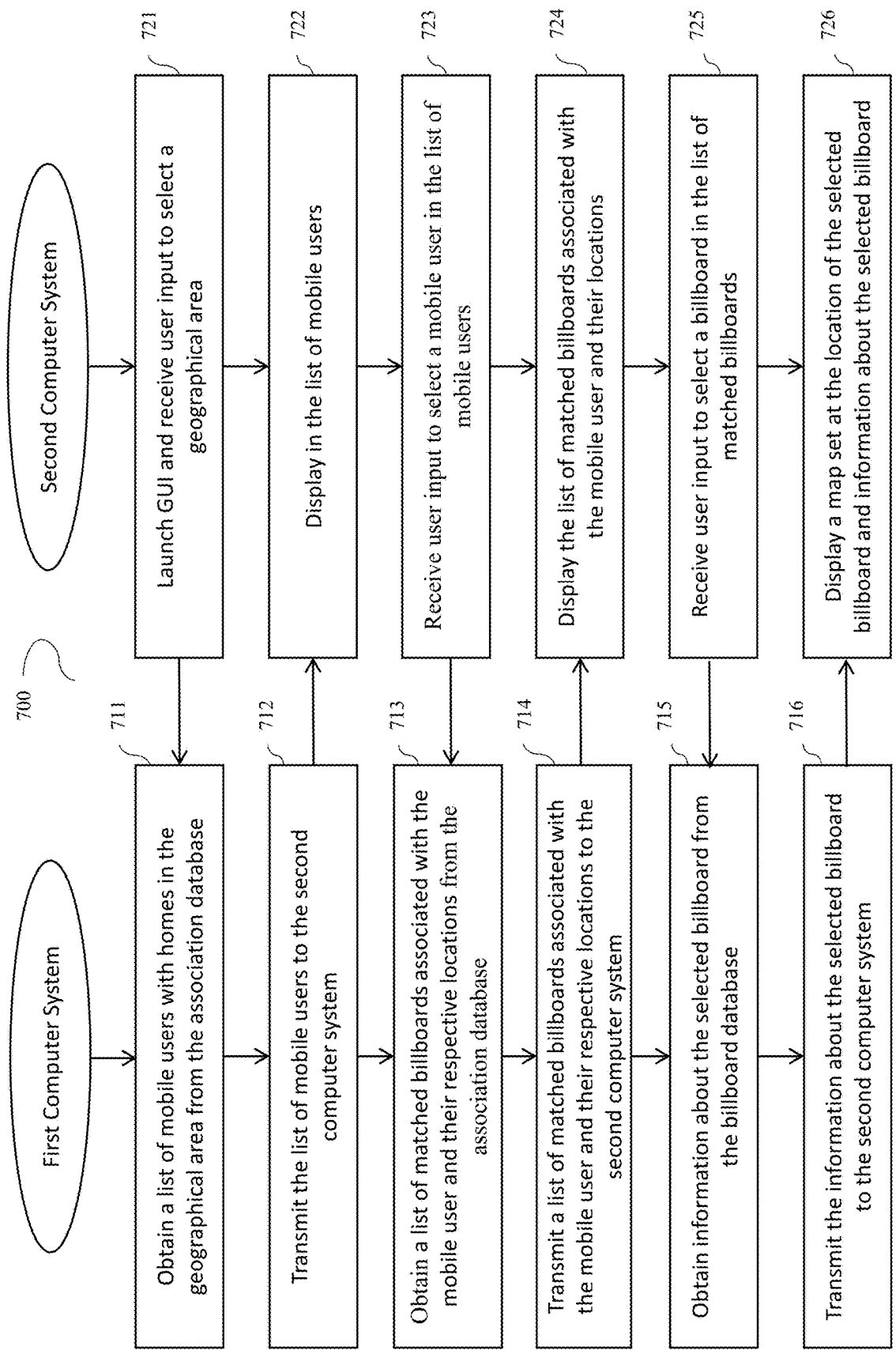
FIG. 7 is a flowchart illustrating a process performed by a first computer system and a second computer system to provide a graphic user interface GUI at the second computer system to display data in an association database according to certain embodiments.

FIGS. 6A to 6C are screenshots of a graphic user interface (GUI) provided by the interface engine 279 to display the content of the association database according to certain embodiments. In certain embodiments, the GUI can be provided by the computer system 200 running the interface engine 279, or any of the other computer system 120 coupled to the computer system 200 via the packet-based network 100. Another computer system 120 can run an application program that interacts with the interface engine 279 in the computer system 200 to provide the GUI to display data in the association database 286. FIG. 7 is a flowchart illustrating a process 700 performed by a first computer system 200 and a second computer system 120 to provide the GUI at the second computer system. Process 700 includes blocks 711 through 716 at the first computer system and blocks 721 through 726 at the second computer system.

At block 721, the GUI is launched at the second computer system and a user input to select a geographical area is received via the GUI and transmitted to the first computer system. In response, a list of mobile users (identified by respective user IDs or uid) with homes in the geographical area is obtained by the interface engine 279 at block 711 from the association database 286, together with other data, such as a discovered home location (in a latitude/longitude coordinate pair), a number of key places, a number of matched billboards, etc., associated with each of the listed mobile user, from the association database 286, and transmitted at block 721 to the second computer system. In certain embodiments, for privacy reasons, a 9 digit zip code is used in lieu of the lat/lng pair as the user location. At block 722, the list of mobile users together with the other information is displayed via the GUI. At block 723, a user input to select a mobile user in the list of mobile users is received and transmitted to the first computer system. The user input can be made by, for example, the user of the GUI clicking on any place in the row of data corresponding to the selected mobile user. In response, a list of matched billboards associated with the mobile user and their respective locations are obtained by the interface engine 279 at block 713 from the association database 286, and transmitted at block 714 to the second computer system.

At block 724, the list of matched billboards associated with the mobile user and their locations are displayed, as shown in FIG. 6B. At block 725, a user input to select a billboard in the list of matched billboards is received and transmitted to the first computer system. The user input can be made by, for example, the user of the GUI clicking on any place in the row of data corresponding to the selected billboard. In response, information about the selected billboard is obtained by the interface engine 279 at block 715 from the billboard database 283 and transmitted at block 716 to the second computer system. At block 726, a map set at the location of the selected billboard and information about the selected billboard are displayed, as shown in FIG. 6C. The information about the selected billboard can be displayed using, for example, a pop-up window over the map, as shown in FIG. 6C. The user can scroll up and down the pop-up window to see all of the data related to the selected billboard from the billboard database 283. The interface engine 279 may also enable showing segments of the public roads on which the selected billboard is viewable by highlighting the road segments using, for example, dotted lines in a contrasting color on the map. The GUI allows the user to change the geographic area in the display by zooming in and out and by moving the map around using the mouse.

As shown in FIG. 6A, the association database 286 includes a number of entries each corresponding with a mobile device (or mobile user), which/who is identified by a mobile device ID or user ID (uid). Associated with each mobile device (user) are the user's home location, a number of other key places (including, for example, an office or work place), and a number of matched billboards (bb). Details about each of the matched billboards (such as those shown in FIG. 6c), as well as estimated routes between the user's key places can also be stored in the association database 286. As shown in FIG. 6B, each billboard/POI is also associated with a number of mobile users with routes passing by the billboard/POI. Thus, the billboards are associated with respective mobile devices who are likely to see or have seen the information displayed on the billboard as they travel on their respective routes. Alternatively or additionally, some POIs are also associated with respective mobile users who are likely to stop by the POIs as they travel on their respective routes. Examples of such POIs include, but are not limited to, restaurants, stores, shops, offices, recreational facilities, etc.

In certain embodiments, the association database 286 is used by the real-time process 302 to select an information document for delivering to a mobile device in response to an information request associated with the mobile devices. As shown in FIG. 3, the real-time process 302 includes blocks 360, 370 and 380. At block 360, the request processor 272 receives an information request in the form of one or more data packets from the packet-based network 100. In certain embodiments, the information request is transmitted by a publisher interacting with a particular mobile device via the packet-based network and includes location data and other information about the particular mobile device, including the UID associated with the mobile device.

At block 370, the request processor 272 searches the association database 286 to determine whether the mobile device ID or UID of the particular mobile device is in the association database 286 and has associated therewith one or more billboards/POIs. If the mobile device ID or UID of the particular mobile device is in the association database 286 and has associated therewith one or more billboards/POIs, or one or more information documents related to the one or more billboards/POIs, process 302 may proceed to block 380, at which the one or more information documents related to the one or more billboards/POIs are ranked based on certain factors such as the meta data about the one or more billboards/POIs, the information displayed, information about the user of the particular mobile device (e.g., age, gender, education level, and related historical/statistical data, etc.), time of day, campaign budgets, etc., and an information document related to one of the one or more billboards/POIs is selected and transmitted to the packet-based network 100 for delivery to the particular mobile device. In certain embodiments, the information document includes information related to at least some of the information publicly displayed on a selected billboard or information about a selected POI (e.g., name, address, phone number, merchandise/services offered, etc.). In certain embodiments, when more than one billboards/POIs are associated with the particular mobile devices, a billboard/POI is selected based on further information about the particular mobile device and its user, further information of the associated billboards/POI, and/or campaign data in the campaign database 287.

In some embodiments, when multiple billboards/POIs are associated with the UID, one of the multiple billboards can be selected based on user behavior deduced from statistical data associated with the particular mobile devices. For example, if the location data collected from the particular mobile device indicate that its user has a history of visiting a point of interest related to a particular one or the multiple billboards/POIs, an information document corresponding to that billboard/POI would be more favored during the selection process.

Figure 8A:
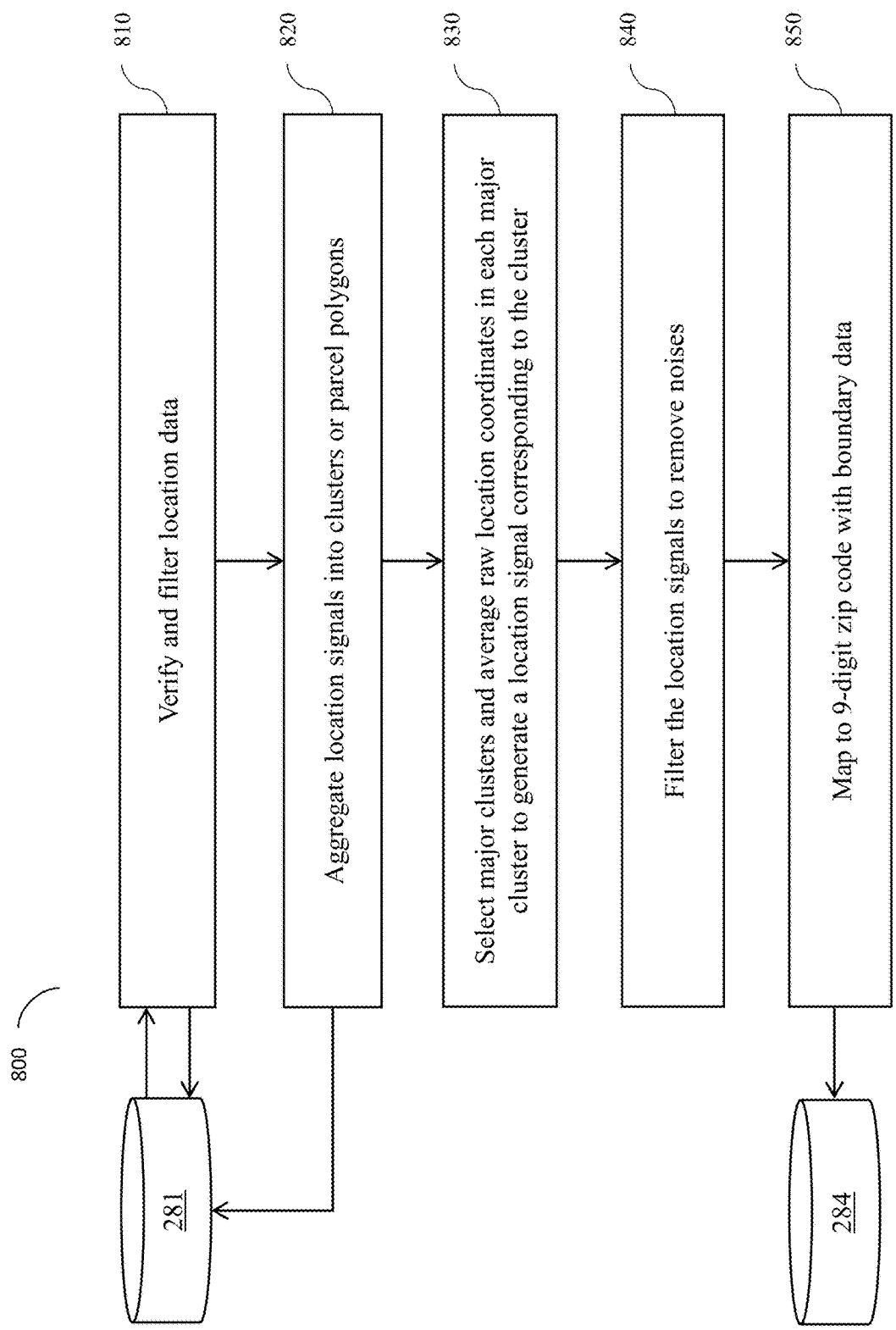
FIG. 8A is a flow diagram illustrating a process for discovering certain types of key places according to certain embodiments.

FIG. 8A is a flow chart illustrating a process 800 for discovering the home location for a particular mobile device, which can be included in the offline process 301 shown in FIG. 3. As shown in FIG. 8, process 800 includes blocks 810, 820, 830, 840, and 850. At block 810, the location engine 273 verifies and filters the location signals collected over a time period (e.g., 6 months) to select high-accuracy (lat/lng) locations from the location database 282. Each location signal corresponds to a location update or an information request and includes a user ID (UID), and one or more of: a set of location coordinates (e.g., a lat/lng pair). It may further include a name of a city, name of a state, zip code, and an IP address (if the mobile device is communicating with the network 100 via a WiFi hot spot), etc. In certain embodiments, the location engine disclosed in commonly owned U.S. patent application Ser. No. 14/716,816, entitled "System and Method for Estimating Mobile Device Locations," filed May 19, 2015, which is incorporated herein by reference in its entirety, can be used to effectively filter out most of the non-accurate location data signals.

Figure 8B:
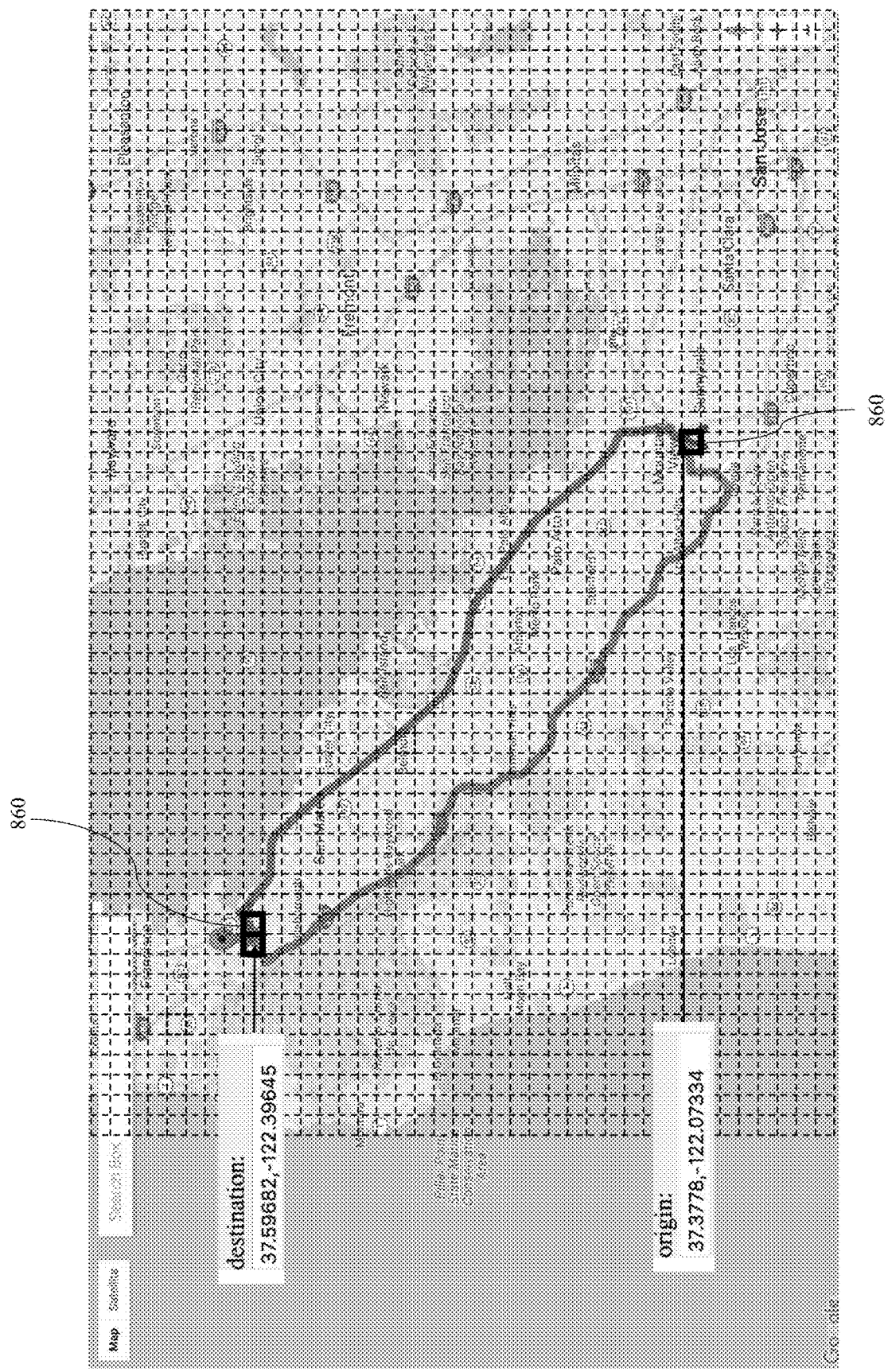
FIG. 8B is a map overlay diagram showing the proxy clusters as squares of land areas in a geographical area according to certain embodiments.

As known, the general public spend most of their time at home and at work. Thus, the most common key places are home and office. In certain embodiments, an overall strategy of home detection is to cluster the (lat/lng) points into residence-sized boxes or map them to land parcels, and calculate the center (lat/lng) of the densest cluster. Thus, at block 820, the key places finder 274 aggregates location data signals associated with the particular mobile device with time stamps within a preset time period into proxy clusters or parcel polygons. In certain embodiments, an observation time period (e.g., one month) is divided into time intervals and each time interval (e.g., an hour) is considered as a session and within a session each set of location data (lat/lng) is considered only once. Thus, the possibility of individual high frequency (lat/lng) pair skewing the final (lat/lng) prediction is avoided. For each session, the lat/lng pairs can be clustered into, for example, residence-sized (e.g., ~50 m square) boxes by downgrading them to 3.5 digit accuracy, as an initial step of selecting a relatively dense proxy cluster of lat/lng pairs. FIG. 8B is a map overlay diagram showing the proxy clusters as squares of land areas in a geographical area (e.g., the San Francisco Bay Area). When location data coverage over land parcels is sufficient, the proxy clusters can be replaced by parcel polygons delineating the boundaries of land parcels, which can be derived using map data 282. FIG. 8C illustrates some of the hourly aggregation of location data signals associated with a mobile device. As shown in FIG. 8C, location data signals belonging to a lat/lng cluster or a land parcel are aggregated in each hourly session so that the lat/lng cluster or land parcel has a location point of "1" or "0" for each hourly session, with a location point of "1" indicating the presence of one or more location signals in that hourly session and a location point of "0" indicating the absence of any location signal in the lat/lng cluster or a land parcel and in the hourly session.

Figure 9:
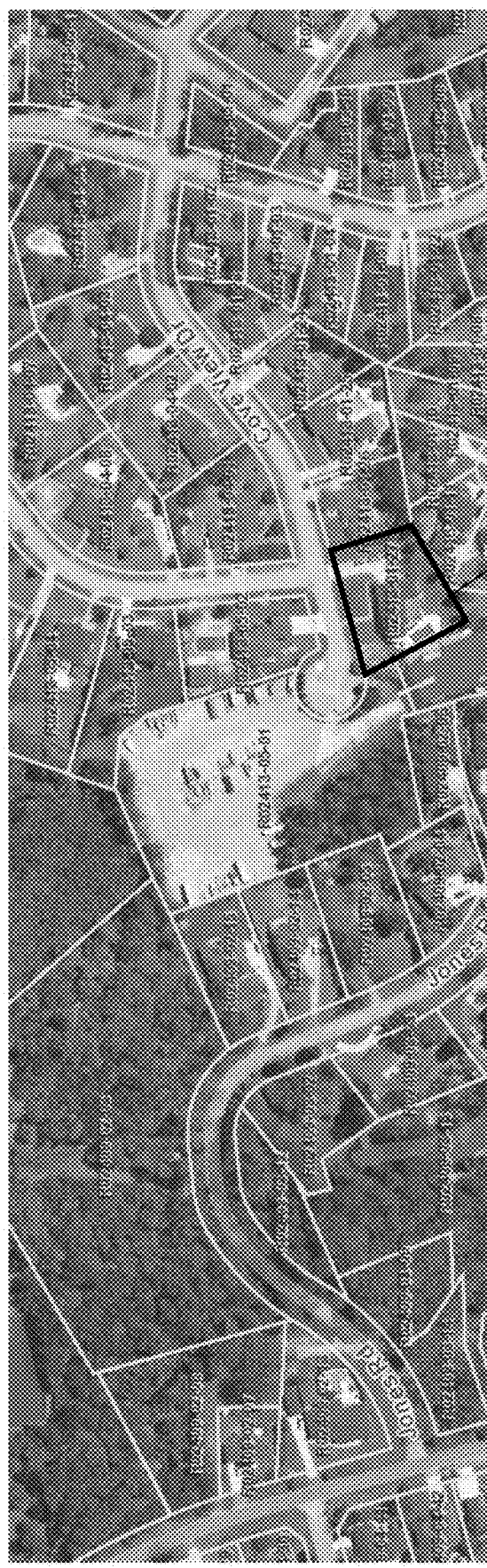
FIG. 9 is a map overlay diagram illustrating land parcels and how raw location data in a land parcel are averaged to generate a center of weight corresponding to the land parcel according to certain embodiments.
Figure 9:
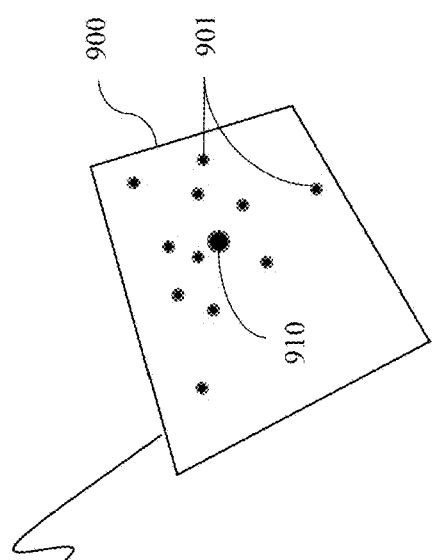

At block 830, the key place finder 273 selects a number major clusters or land parcels (shown as 860 in FIG. 8B) based on the hourly aggregation of location data over the course of, for example, one month. A major cluster may be selected based on the density of location points for that cluster or land parcel. The density of the location points for each cluster or parcel can be determined by, for example, summing the location points of the hourly sessions over, for example, one month, and a cluster or location parcel having significantly higher density than at least some of its surrounding parcels can be selected as a major cluster or location parcel. In certain embodiments, up to a certain number (e.g., 10) of major clusters or land parcels are selected. For some mobile devices, whose mobile users spend most of their times between work and home, there would be less major clusters or land parcels. Then, as shown in FIG. 9, for each major cluster or land parcel 900, the raw location data 901 in the cluster or land parcel collected over the course of, for example, 6 months, are averaged to generate a center of weight (CW) 910 corresponding to the cluster or land parcel.

Although FIG. 8B shows that the lat/lng cluster boxes are about equal in size, in practice, they can be different in size. For example, smaller sized lat/lng boxes can be used where the location points are denser or where the area is more densely populated, and larger sized lat/lng boxes can be used where the location points are sparse or where the area is less densely populated, so as to save computation time. Also, when multiple adjacent parcels have comparable densities that are significantly higher than surrounding parcels, the multiple adjacent parcels can be combined and the center of weight of the location points in the multiple adjacent parcels are used to define a place for the mobile user.

Figure 10:
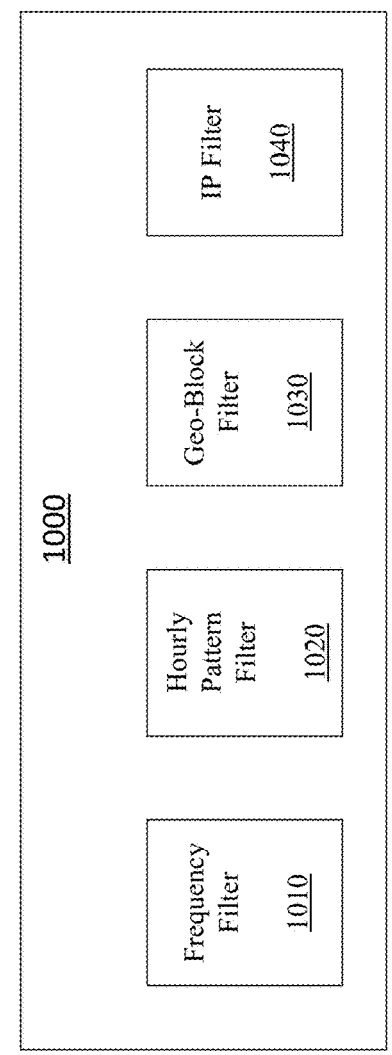
FIG. 10 is a block diagram illustrating a plurality of filters according to certain embodiments.

At block 840, the key place finder 273 applies filters on the location signal corresponding to each of the major clusters or land parcels to remove noise and retain only residential signals. As shown in FIG. 10, the filters 1000 may include, for example, a frequency threshold filter 1010, an hourly pattern filter 1020, a geo-block filter 1030, and an IP filter 1040, etc. The frequency threshold filter 1010 examines the location signals in each of the major clusters or land parcels to determine whether the frequency of visits by the user of the particular mobile device to the major cluster or land parcel is above a preset threshold. For example, a major cluster or land parcel (e.g., cluster/parcel ID #u9xxxxxx in FIG. 8C) may be selected because it has a library or school where a lot of location signals are generated each time the user visits but the user only visits the place once or twice a week. Such a place would be filtered out because the user's visits are of low-frequency. The hourly pattern filter 1020 examines the location signals in each of the major clusters or land parcels to determine whether location signals there are mostly in weekends and evening and/or early morning hours and are thus more likely to be from home (e.g., cluster/parcel ID #a2xxxxxx in FIG. 8C).

Figure 11A:
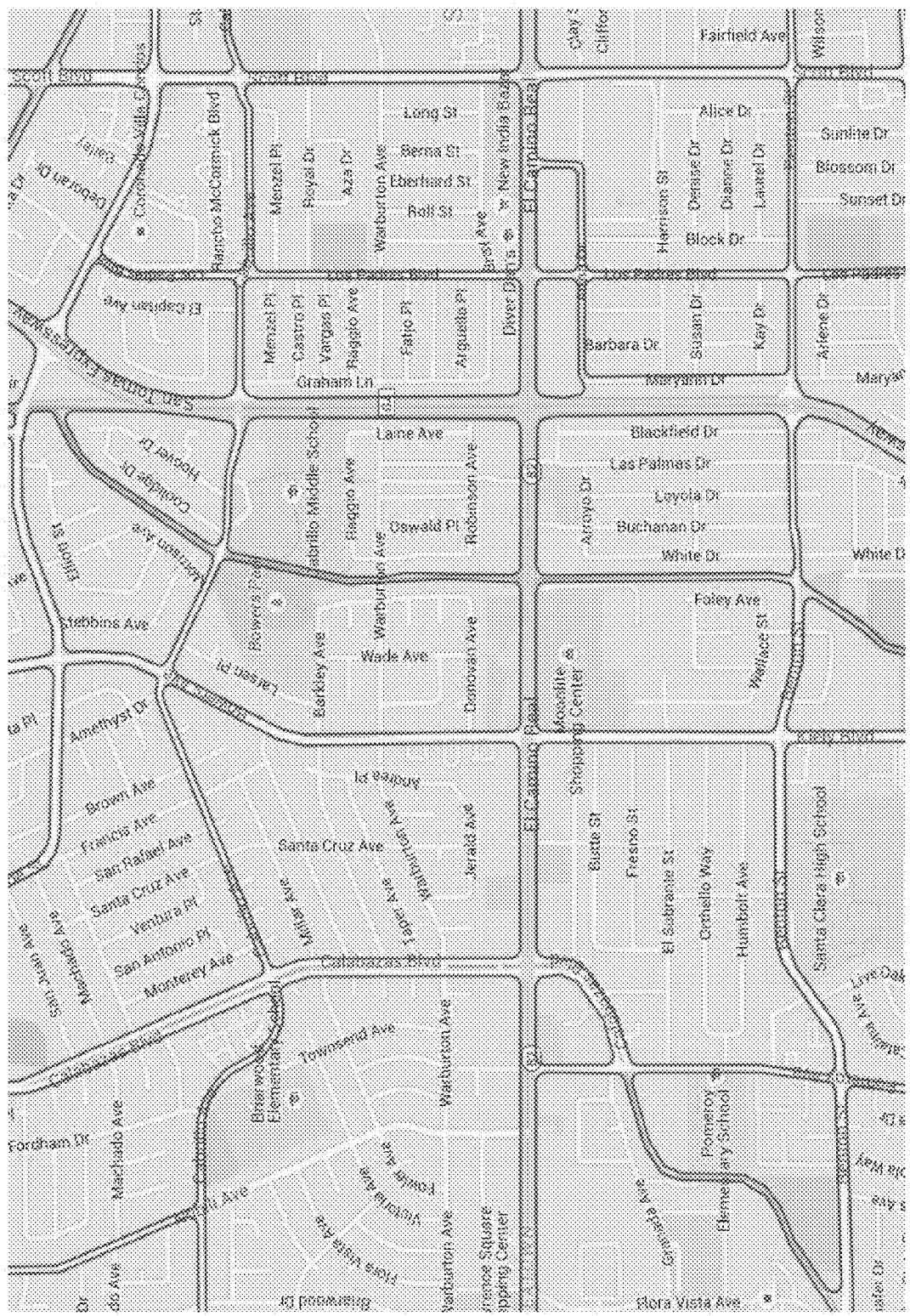
FIG. 11A illustrates exemplary geo-blocks overlaid on a map of an area according to certain embodiments.

The geo-block filter 1030 determines whether the major cluster or land parcel belongs to an area zoned for residential use. In certain embodiments, the geo-block filter 1030 determines whether the major cluster or land parcel is part of or substantially overlaps with one or more geo-blocks defined using the technology disclosed in commonly owned U.S. patent application Ser. No. 15/344,482, entitled "System and Methods for Performance Driven Dynamic Geo-Fence Based Targeting," filed Nov. 4, 2016, and whether the one or more geo-blocks are residential geo-blocks. FIG. 11A illustrates exemplary geo-blocks overlaid on a map of an area in the city of Santa Clara, Calif. The geo-blocks are shown as outlined in red boundaries that are mostly aligned with major roads, taking into account the road width so as to exclude mobile signals from travelers on the major roads. Each of the geo-blocks shown can be further partitioned into more granular blocks bordered by smaller roads. Real world entities present in these geo-blocks tend to serve common functional purposes (residential, retail etc.) These blocks also form the foundation for the construction of boundaries that are highly indicative of location dependent attributes such as intention and demographics. By mapping the major clusters or land parcels into geo-blocks, other user relevant information, such as demographics and household income, can be estimated approximately. Thus targeting can become more accurate and efficient.

In certain embodiments, the IP filter 1040 examines the location signals in each of the major clusters or land parcels to determine whether they are associated with a single WiFi IP address. The IP filter 1040 further examines how many other mobile devices have associated location data including the same IP address. For example, if the major cluster or land parcel has a library or coffee shop, its IP address would be in the location data associated with a large number (e.g., 1000) mobile devices. Such a cluster or land parcel is unlikely to be a residence and is therefore filtered out. After applying the filters 1000 to remove location noises and keep only residential signals, the representative lat/lng pair for each of the rest of the major clusters or land parcels is mapped to a 9-digit zip code area with boundary data of the area. For privacy purposes, only the zip code is stored in the key places database 284 with the identification of the mobile device (or its user).

Figure 11B:
FIG. 11B illustrates examples of discovered home (latitude longitude) pairs located in a residential geo-block plotted on an air view of the area according to certain embodiments.

FIG. 11B illustrates exemplary home (lat lng) pairs (shown as red balloons), located in a residential geo-block in Mountain View, CA. Plotted on an air view of the area, most of the (lat lng) pairs are seen to fall onto the roof and backyards of residence buildings.

Figure 12A:
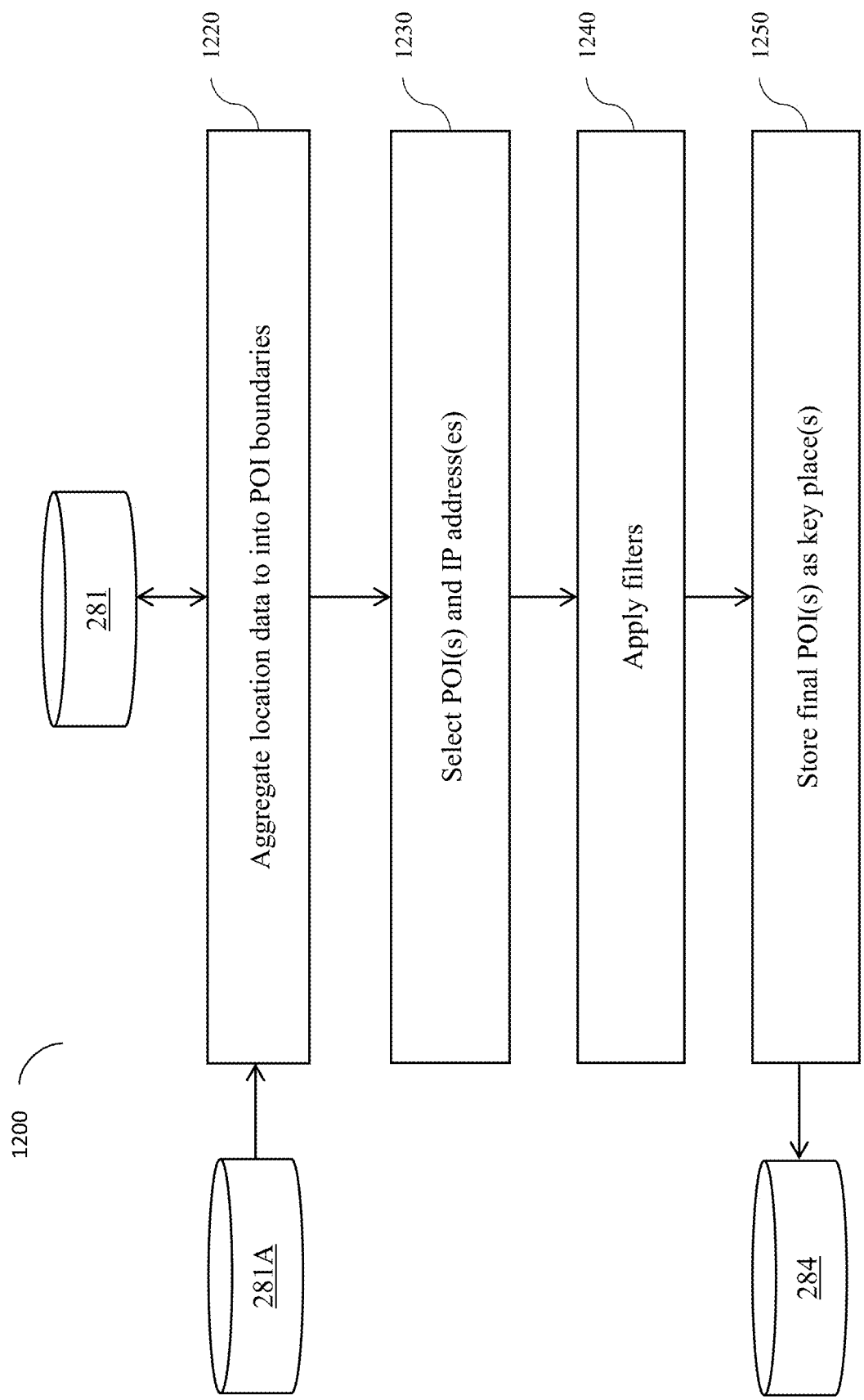
FIG. 12A is a flow diagram illustrating a process for discovering a point of interest as one of the key places according to certain embodiments.
Figure 12B:
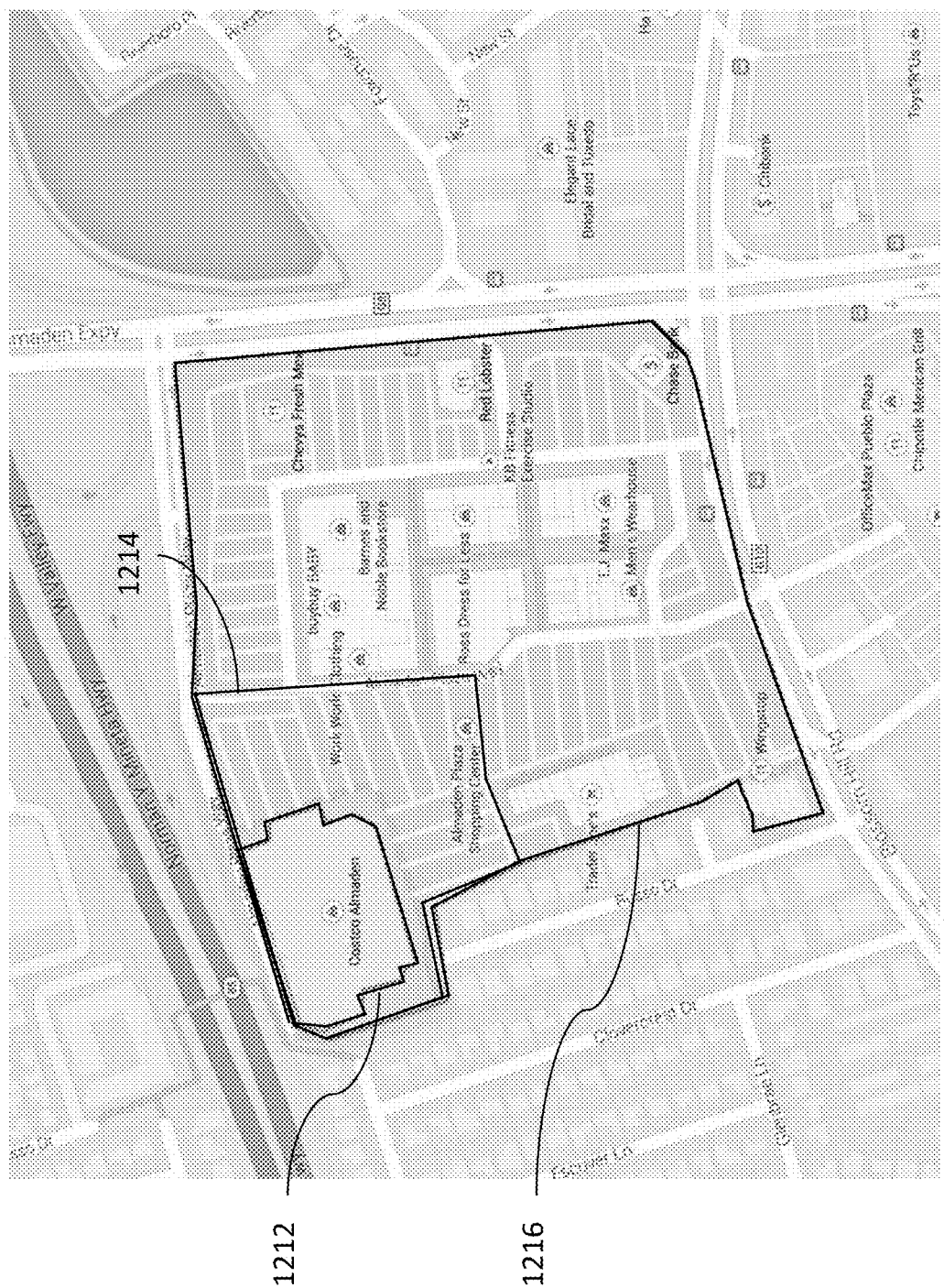
FIG. 12B is a map overlay diagram illustrating polygons defined in conformity with geographical configuration and surroundings of a POI according to certain embodiments.

FIG. 12 illustrates a flowchart diagram of a process 1200 for discovering the office location for the user of a particular mobile device. The process 1200 includes blocks 1220, 1230, 1240, and 1250. At block 1220, a process similar to that in block 820 is used for location data aggregation except that, instead of proxy clusters or land parcels, the key place finder maps the location data from location database 281 into the geo-fences defined for various points of interest (POIs) in the POI database 289. The geo-fence for a POI can be, for example, a radius fence around a center of the POI or one or more multi-polygons defining one or more boundaries of the POI, as described in U.S. patent application Ser. No. 14/716,811, entitled "System and Method for Marketing Mobile Advertising Supplies," filed May 19, 2015, which is incorporated herein by reference in its entirety. As shown in FIG. 12B, one or more polygons can be defined in conformity with the geographical configuration and surroundings of a POI, such as a polygon of a first type 1212 around the building of the store, a polygon of a second type 1214 around a premise of the POI including, for example, the building and its parking lot, and/or a polygon of a third type 1216 around a shopping area or business region including the store and other stores. The key place finder 274 may choose any of the one or more polygons based on the type of associated POI and the sufficiency of location signals.

At block 1230, a process similar to that of block 830 is used to select one or more POIs and associated IP address (es) based on aggregated location signals. At block 1240, a frequency filter similar to that of block 840 is used to filter the aggregated location signals of the selected one or more POIs. After filtering, the remaining POI(s) are stored in the key places database 284. Other types of key places, such as schools, libraries, gyms, parks, shopping malls, etc. can also be discovered similarly.

In certain embodiments, once the key places for a mobile user are determined, one or more routes can be estimated between the key places. For example, as shown in FIG. 8B, between the mobile user's workplace (shown as "origin") and the mobile user's home (shown as "destination"), one or more shortest and/or fastest routes can be determined using publicly available map data. This process can be repeated between any two of the mobile user's key places to estimate the routes the mobile user routinely takes. For each route determined, billboards and/or other points of interests (POIs) along the route are identified and associated with the route or the mobile user.

The techniques described above for discovering key places have many applications. For example:

- It could improve behavioral audiences, such as high household income audiences, as well as other audiences, such as luxury brands buyers etc. (Government demographics data only have household income at the zip code accuracy level, but with home/office locations at the parcel or geo-block level together and history data of store visitation, more accurate household income audiences can be built.)
- It could improve geo-block targeting and identify similar users within a neighborhood, by further narrowing down targeting to specific households.
- It could help advertisers reach potential customers if a store is between the user's home and office locations. As discussed above, regular commute routes between home and office can be derived, stores matching the user's interest but the user rarely visits can be identified and display to the user. It can provide good insights for advertisers to understand more about their customers and eventually help them provide better services.
- It could help detect employees to improve targeting accuracy. Removing employees of a store from the targeting audience of the store can help build better behavioral audiences and measure store visitation metrics more accurately.
- It could help identify different devices within the same household and improve targeting efficiency. In such cases, both (lat/lng) and IP signals can be used to tie user IDs (uid) together within the same household.
- It could be used to deliver publicly displayed information to mobile devices. As discussed above, in certain embodiments, two fastest routes between a mobile user's home and office are derived using map data and billboards likely to be seen by travelers on the routes are identified. The mobile user is then associated with the billboards for either real-time targeting or offline targeting.

Figure 13:
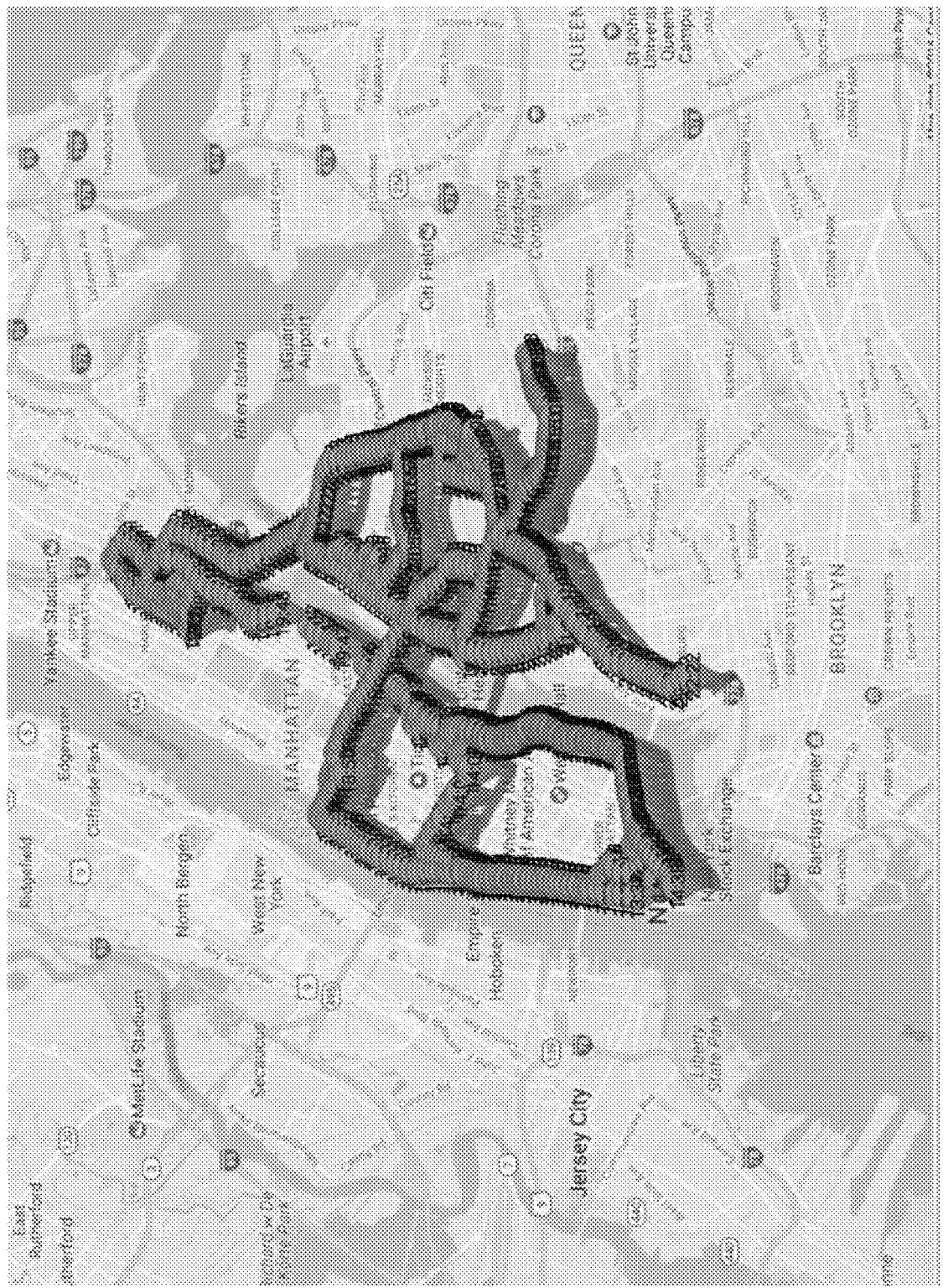
FIG. 13 is a map overlay diagram illustrating tracing of mobile user travel routes using periodic location updates generated by an associated mobile device over a period of time according to certain embodiments.
Figure 14:
FIG. 14 is a zoomed in view of the map overlay diagram in FIG. 13.

Additionally or alternatively, for a mobile device 130 having one or more apps running in the background that cause the mobile device to periodically transmit location updates signals or data packets to the computer system 200, either directly or through one or more other computer systems 120, routes can be discovered by tracing the location updates, as shown in FIG. 13, where the red balloons mark the locations on a map of a geographical area (e.g., New York City), which are detected from the location updates from a mobile device. FIG. 14 zooms in on FIG. 13 and shows detected locations of the mobile device as red balloons each associated with a time stamp. Thus, in addition to routes, the speed at which the user of the mobile device is traveling on a certain route or a section of a certain route can also be estimated using the time stamps of every two neighboring locations and the distance between them. The speed can be averaged over the travel route or a section thereof.

In certain embodiments, as shown in FIGS. 13 and 14, based on the periodic location updates from a mobile device over a period of time, the routes the user of the mobile device (mobile user) routinely takes can be determined and used to learn about or predict the mobile user's interests in certain information. For example, if the mobile user routinely takes a certain route or has taken a certain route, the mobile user is likely to have seen information publicly displayed on billboards along the certain route or is likely to have seen or to stop by certain POIs along the certain route. Thus, in certain embodiments, some of the billboards/POIs along the routes of the mobile user are selected and associated with the mobile user in the association database 286. In certain embodiments, selection of the billboards/POIs for association with the mobile user takes into account the travel speed at which the mobile user travels along a particular route. For example, if the mobile user is determined to regularly walk along a particular route, smaller sized billboard (e.g., those posted at street level window and bus stands) along the particular route would be noticeable by the mobile user and thus selected to be associated with the mobile user. On the other hand, if the user is determined to be driving at a significant speed along another route, larger billboards along this other route are selected.

We claim:

1. A method implemented using one or more computer systems coupled to a packet-based network, the one or more computer systems including or having access to a data store storing therein map data of a geographical region, the method comprising:

acquiring location data corresponding to a plurality of location signals of a mobile device communicating with the packet-based network via one or more software applications on the mobile device, the plurality of location signals indicating mobile device locations in the geographical region with corresponding time stamps at different points in time during a time period;

storing the location data in a location data store;

discovering from the location data a plurality of key places where a user of the mobile device regularly visits or stays based on densities of location signals mapped into the geographical region;

determining one or more travel routes in the geographical region between the plurality of key places using the map data;

searching in a billboard database for one or more billboards located along the one or more travel routes, the billboard database storing therein respective billboard data associated with each respective billboard of a plurality of billboards in the geographical region, the respective billboard data including data indicating a respective location of the respective billboard;

associating the one or more billboards located along the one or more travel routes with the mobile device in an association database;

receiving an information request associated with the mobile device from the packet-based network;

determining whether the mobile device is associated with the one or more billboards in the association database; and selecting an information document for delivering to the mobile device from a document database, the information document corresponding to one of the one or more billboards and including information displayed by the one of the one or more billboards.

2. The method of claim 1, wherein discovering from the location data a plurality of key places comprises:

dividing the time period into a plurality of sessions;

for each of the plurality of sessions, mapping location signals with time stamps in the each of the plurality of sessions into predefined areas in the geographical region;

determining a density of location signals in each of the predefined areas based on location signals mapped into each of the predefined areas;

selecting a set of major areas from the predefined areas based on densities of location signals in the predefined area; and applying one or more filters to each of the set of major areas to select a subset of the set of major areas as the key places.

3. The method of claim 2, wherein the one or more filters include a frequency threshold filter configured to examine the location signals mapped into each of the set of major areas to determine a frequency of visits to the each of the set of major areas by the user of the mobile device and whether the frequency is above a predefined frequency threshold.

4. The method of claim 2, wherein the one or more filters include an hourly pattern filter configured to examine the location signals mapped into each of the set of major areas to determine if any of the set of major areas corresponds to a home of the user of the mobile device.

5. The method of claim 2, wherein the one or more filters includes a geo-block filter configured to determine a geo-block for each of the set of major areas to determine if any of the set of major areas corresponds to a home of the user of the mobile device.

6. The method of claim 2, wherein at least some of the plurality of location signals include IP addresses, wherein the one or more filters include an IP filter configured to determine whether location signals mapped into any of the set of major areas include a single IP address.

7. The method of claim 6, wherein the IP filter is further configured to determine how many other mobile devices have also communicated with the packet-based network via a same IP address during the time period.

8. The method of claim 2, further comprising, dividing the geographical region into residence-sized boxes to generate the predefined areas.

9. The method of claim 2, wherein each of at least some of the predefined areas corresponds to a land parcel.

10. The method of claim 2, wherein each of at least some of the predefined areas corresponds to a point of interest.

11. A method implemented using one or more computer systems coupled to a packet-based network, the one or more computer systems including or having access to a data store storing therein map data of a geographical area, the method comprising:

acquiring location data corresponding to a plurality of location signals of a mobile device communicating with the packet-based network via one or more software applications on the mobile device, the plurality of location signals indicating mobile device locations in a geographical area with corresponding time stamps at different points in time during a time period;

storing the location data in a location data store;

determining one or more travel routes in the geographical area based on mapping of the plurality location signals into the geographical area;

estimating a speed at which a user of the mobile device travels on each of the one or more travel routes based on the map data;

searching in a billboard database for billboards located along the one or more travel routes, the billboard database storing therein billboard data associated with a plurality of billboards in the geographical area, respective billboard data associated with each respective billboard including data indicating a respective location of the respective billboard, a respective size of the respective billboard, and a respective type of the respective billboard;

selecting one or more billboards from the billboards located along the one or more travel routes based at least on the speed at which the user of the mobile device travels on each of the one or more travel routes and billboard data associated with the one or more billboards;

associating the one or more billboards with the mobile device in an association database;

receiving an information request associated with the mobile device from the packet-based network;

determining whether the mobile device is associated with the one or more billboards in the association database; and selecting an information document for delivering to the mobile device from a document database, the information document corresponding to one of the one or more billboards and including information displayed by the one of the one or more billboards.

12. The method of claim 11, wherein determining one or more travel routes comprises tracing mobile device locations on a map of the geographical area.

13. The method of claim 12, wherein the speed at which a user of the mobile device travels on each of the one or more travel routes is determined based on the mobile device locations and the time stamps corresponding to the mobile device locations.

14. A method implemented by a first computer system to enable visualizing an association database using a graphical user interface (GUI) on a second computer system coupled to the first computer system via packet-based network, comprising:

acquiring location data corresponding to a plurality of location signals of a mobile device communicating with the packet-based network via one or more software applications on the mobile device, the plurality of location signals indicating mobile device locations in the geographical region with corresponding time stamps at different points in time during a time period;

storing the location data in a location data store;

determining one or more travel routes in the geographical region based on mapping of the plurality location signals into the geographical region;

searching in a billboard database for one or more billboards located along the one or more travel routes, the billboard database storing therein billboard data associated with a plurality of billboards in the geographical area, respective billboard data associated with each respective billboard including data indicating a respective location of the respective billboard;

associating the one or more billboards with the mobile device in an association database;

receiving from the second computer system a selection of a geographical area;

transmitting a list of one or more mobile users each having one or more associated billboards in the geographical area based on the association database;

receiving from the second computer system a selection of a particular mobile user;

transmitting to the second computer system a list of matched billboards associated with the particular mobile user and the matched billboards' respective locations;

receiving from the second computer system a selection of a particular billboard among the list of matched billboards; and transmitting information about the particular billboard to the second computer system to enable the GUI to zoom in on a location of the billboard on a map of the geographical area, to mark the billboard on the map, and to display the information of the billboard in a display window, the information about the particular billboard including data indicating:
a location of the particular billboard;
a size of the particular billboard; and
a type of the particular billboard.

15. The method of claim 14, wherein the one or more travel routes include one or more travel routes between a mobile user's home and work place.

16. The method of claim 1, wherein the one or more billboards include multiple billboards, the method further comprising selecting a billboard from the multiple billboard based on at least some of:
billboard data associated with each of the multiple billboards;
information about a user of the mobile device;
behavior of the user of the mobile device deduced from the location data;
time of day at which the information request is received; and
speed of travel over at least part of the travel routes.

17. The method of claim 1, wherein the one or more billboards include multiple billboards, and wherein the information document is selected from a plurality of information documents associated with the multiple billboards based on at least some of:
billboard data associated with each of the multiple billboards;
information about a user of the mobile device;
behavior of the user of the mobile device deduced from the location data;
time of day at which the information request is received; and
speed of travel over at least part of the travel routes.

18. The method of claim 1, wherein the plurality of key places include the user's home and work place, and wherein the one or more travel routes include one or both of a fastest route between the user's home and the work place and a shortest route between the user's home and the work place.

19. The method of claim 1, wherein the one or more billboards include multiple billboards, the method further comprising selecting a billboard from the multiple billboard based on at least some of:
billboard data associated with each of the multiple billboards;
information about a user of the mobile device;
behavior of the user of the mobile device deduced from the location data; and
time of day at which the information request is received.

20. The method of claim 11, wherein the one or more billboards include multiple billboards, and wherein the information document is selected from a plurality of information documents associated with the multiple billboards based on at least some of:
billboard data associated with each of the multiple billboards;
information about a user of the mobile device;
behavior of the user of the mobile device deduced from the location data; and
time of day at which the information request is received.

* * * * *